United States Patent
Bhushan et al.

(10) Patent No.: US 10,594,652 B2
(45) Date of Patent: Mar. 17, 2020

(54) WIRELESS COMMUNICATION UTILIZING A UNIFIED AIR INTERFACE

(71) Applicant: QUALCOMM Incorporated, San Diego, CA (US)

(72) Inventors: Naga Bhushan, San Diego, CA (US); John Edward Smee, San Diego, CA (US); Joseph Binamira Soriaga, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 14/699,986

(22) Filed: Apr. 29, 2015

(65) Prior Publication Data

US 2016/0112992 A1    Apr. 21, 2016

Related U.S. Application Data

(60) Provisional application No. 62/064,928, filed on Oct. 16, 2014.

(51) Int. Cl.
*H04L 29/12* (2006.01)
*H04W 72/12* (2009.01)
(Continued)

(52) U.S. Cl.
CPC ........ *H04L 61/6022* (2013.01); *H04L 5/0005* (2013.01); *H04L 5/0042* (2013.01);
(Continued)

(58) Field of Classification Search
CPC ... H04L 5/0007; H04L 5/0042; H04L 5/0044; H04L 5/0092; H04W 72/04;
(Continued)

(56) References Cited

U.S. PATENT DOCUMENTS 6,570,883 B1   5/2003  Wong
8,804,649 B1   8/2014  Guan et al.
(Continued)

FOREIGN PATENT DOCUMENTS

CN   1692582 A   11/2005
EP   1492269 B1   2/2007
(Continued)

OTHER PUBLICATIONS

International Search Report and Written Opinion—PCT/US2015/054322—ISA/EPO—dated Apr. 14, 2016.
(Continued)

*Primary Examiner* — Kan Yuen
(74) *Attorney, Agent, or Firm* — Qualcomm IP Dept.; James Hunt Yancey, Jr.

(57) ABSTRACT

Various aspects of the present disclosure provide for methods, apparatus, and computer software for enabling a single media access control (MAC) layer to control a variety of physical (PHY) layers or entities for multiplexing signals corresponding to each of the PHY layers over an air interface. Here, the MAC layer may include a resource manager configured to determine a time-frequency resource allocation within the air interface for communication with one or more subordinate entities utilizing each of the PHY layers. In this way, The MAC entity may provide dynamic control over the allocation of time-frequency resources within a given resource group, which may include transmission time intervals (TTIs) having multiple time scales.

60 Claims, 13 Drawing Sheets

(51) Int. Cl.
*H04L 5/00* (2006.01)
*H04W 72/04* (2009.01)
*H04W 74/08* (2009.01)

(52) U.S. Cl.
CPC .......... *H04L 5/0044* (2013.01); *H04W 72/04* (2013.01); *H04W 72/0446* (2013.01); *H04W 72/0493* (2013.01); *H04W 72/12* (2013.01); *H04W 72/1257* (2013.01); *H04W 72/1263* (2013.01); *H04L 5/0007* (2013.01); *H04L 5/0092* (2013.01); *H04W 72/044* (2013.01); *H04W 74/0808* (2013.01)

(58) Field of Classification Search
CPC ............. H04W 72/044; H04W 72/082; H04W 72/0446; H04W 72/12; H04W 72/1263; H04W 74/0808
See application file for complete search history.

(56) References Cited

U.S. PATENT DOCUMENTS

| | | | |
|---|---|---|---|
| 2008/0080627 A1* | 4/2008 | Korhonen | H04L 25/03834 375/260 |
| 2009/0069023 A1* | 3/2009 | Ahn | H04L 5/0007 455/450 |
| 2009/0201865 A1 | 8/2009 | Uemura et al. | |
| 2009/0227261 A1* | 9/2009 | Tiirola | H04W 16/10 455/450 |
| 2010/0002675 A1 | 1/2010 | Fu et al. | |
| 2010/0008296 A1 | 1/2010 | Kwon | |
| 2010/0110911 A1* | 5/2010 | Yin | H04L 12/12 370/252 |
| 2011/0044277 A1 | 2/2011 | Moulsley et al. | |
| 2011/0171929 A1 | 7/2011 | Tamura et al. | |
| 2012/0099520 A1* | 4/2012 | Kwon | H04B 7/155 370/315 |
| 2012/0113951 A1 | 5/2012 | Koo et al. | |
| 2012/0213196 A1* | 8/2012 | Chung | H04B 1/713 370/330 |
| 2013/0051233 A1 | 2/2013 | Yang et al. | |
| 2013/0156005 A1 | 6/2013 | Li et al. | |
| 2013/0288697 A1* | 10/2013 | Miao | H04L 5/0007 455/452.1 |
| 2014/0153511 A1 | 6/2014 | Sirotkin | |
| 2015/0139016 A1 | 5/2015 | Ma et al. | |
| 2017/0214655 A1 | 7/2017 | Bhushan et al. | |
| 2019/0028433 A1 | 1/2019 | Bhushan et al. | |

FOREIGN PATENT DOCUMENTS

| | | |
|---|---|---|
| JP | 2005073240 A | 3/2005 |
| JP | 2009513043 A | 3/2009 |
| JP | 2014513454 A | 5/2014 |
| WO | 2007045504 A1 | 4/2007 |
| WO | 2009050811 A1 | 4/2009 |
| WO | 2012124958 A2 | 9/2012 |
| WO | WO-2013162615 A1 | 10/2013 |

OTHER PUBLICATIONS

Partial International Search Report—PCT/US2014/054322—ISA/EPO—dated Jan. 21, 2016.
Kang C.G., et al., "5G System Requirements & Technical Issues," KRnet 2014, Jun. 23, 2014, 48 pages.
Ryu S.M., et al., "Project: IEEE P802.15 Working Group for Wireless Personal Area Networks (WPANs)," PicoCast MAC Protocol, IEEE 802. 15-09-0142-00-0006, Contribution to IEEE 802. 15.6 Meeting, Mar. 2009, 40 pages.
Ryu S.M., et al., "Project: IEEE P802.15 Working Group for Wireless Personal Area Networks (WPANs)," WBAN = Mobile Femto-cell, IEEE 802. 15-09-0003-01-0006, Contribution to IEEE 802.15.6 Meeting, Jan. 16, 2009, 22 pages.
Ullah S., et al., "MAC-Bridging for Multi-PHYs Communication in BAN," Sensors, 2010, vol. 10, pp. 9919-9934.
International Preliminary Report on Patentability—PCT/US2015/054322, The International Bureau of WIPO—Geneva, Switzerland, dated Jan. 16, 2017.
Chafekar, Deepti, et al.; Capacity of Asynchronous Random-Access Scheduling in Wireless Networks; IEEE INFOCOM 2008—The 27th Conference on Computer Communications; Apr. 13-18, 2008; 9 pages.
Nguyen, Duy, et al.; Collision-Free Asynchronous Multi-Channel Access in Ad Hoc Networks; GLOBECOM 2009—2009 IEEE Global Telecommunications Conference; Nov. 30, 2009; 8 pages.
Cover, Thomas M., et al.; Asynchronous Multiple-Access Channel Capacity; IEEE Transactions on Information Theory, vol. IT-27, No. 4, Jul. 1981, pp. 409-413.

* cited by examiner

WIRELESS COMMUNICATION UTILIZING A UNIFIED AIR INTERFACE

CROSS-REFERENCE TO RELATED APPLICATION & PRIORITY CLAIM

This application claims priority to and the benefit of provisional patent application No. 62/064,928, titled "SYSTEM AND METHOD FOR WIRELESS COMMUNICATION UTILIZING A UNIFIED AIR INTERFACE" and filed in the United States Patent and Trademark Office on Oct. 16, 2014, the entire content of which is incorporated herein by reference as if fully set forth below and for all applicable purposes.

TECHNICAL FIELD

Aspects of the present disclosure relate generally to wireless communication systems, and more particularly, to systems and methods that enable multiplexing communication protocols with various waveforms, channel access modes, and link adaptation schemes under a single unified control mechanism.

INTRODUCTION

Wireless communication networks are widely deployed to provide various communication services such as telephony, video, data, messaging, broadcasts, and so on. Such networks, which are usually multiple access networks, support communications for multiple users by sharing the available network resources. In many cases, one set of services or applications provided by these networks have requirements that differ from another set of services or applications. For example, email service might be tolerant to large latency, but require large bandwidth at certain times; while video teleconferencing service might have tight latency requirements with fixed bandwidth requirements. Further, some channel access methods operate quite differently from others, such as the difference between networks that use ultra-high frequency (UHF) code division multiple access (CDMA) and networks that use synchronous orthogonal channels.

In wireless communication systems that utilize different frequencies, operate in different environments, or have different service requirements, substantial differences exist in the air interface design, as well as the physical circuitry used to access the air interface. Accordingly, different control mechanisms exist and system designs are deployed for the variety of networks.

As the demand for mobile broadband access continues to increase, research and development continue to advance wireless communication technologies not only to meet the growing demand for mobile broadband access, but to advance and enhance the user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide for methods, apparatus, and computer software for enabling a single media access control (MAC) layer or MAC entity to control a variety of physical (PHY) layers or physical communication entities for multiplexing wireless channel access schemes having broadly different requirements. The MAC entity may include a resource manager configured to enable dynamic control over the allocation of time-frequency resources, which may utilize transmission time intervals (TTIs) having multiple time scales.

In one aspect, the disclosure provides a scheduling entity configured for wireless communication. Here, the scheduling entity includes at least one processor, a computer-readable medium communicatively coupled to the at least one processor, and a plurality of physical communication entities communicatively coupled to the at least one processor. The physical communication entities are configured for wireless communication utilizing respective waveforms, channel access modes, and/or link adaptation schemes. Further, the at least one processor is configured to control a media access control (MAC) entity, the MAC entity being configured to control each of the plurality of physical communication entities to multiplex signals corresponding to each of the plurality of physical communication entities over an air interface, the MAC entity comprising a resource manager configured to determine a time-frequency resource allocation within the air interface for communication with one or more subordinate entities utilizing each of the physical communication entities.

In another aspect, the disclosure provides a method, operable at a scheduling entity, for wireless communication over an air interface. Here, the method includes segmenting a resource group into a plurality of regions, including a first region comprising time-frequency resources for asynchronous channel access and a second region comprising time-frequency resources for synchronous channel access, the resource group comprising a set of time-frequency resources available for wireless communication over the air interface, determining a time-frequency resource allocation within the air interface for communication with one or more subordinate entities utilizing each of a plurality of physical communication entities at the scheduling entity; and transmitting a signaling message to the one or more subordinate entities, the signaling message configured to indicate the time-frequency resource allocation within the air interface.

In yet another aspect, the disclosure provides a computer-readable medium storing computer-executable code at a scheduling entity, for wireless communication over an air interface. Here, the computer-executable code includes instructions for causing the scheduling entity to segment a resource group into a plurality of regions, including a first region comprising time-frequency resources for asynchronous channel access and a second region comprising time-frequency resources for synchronous channel access, the resource group comprising a set of time-frequency resources available for wireless communication over the air interface; instructions for causing the scheduling entity to determine a time-frequency resource allocation within the air interface for communication with one or more subordinate entities utilizing each of a plurality of physical communication entities at the scheduling entity; and instructions for causing the scheduling entity to transmit a signaling message to the one or more subordinate entities, the signaling message configured to indicate the time-frequency resource allocation within the air interface.

In still another aspect, the disclosure provides a scheduling entity configured for wireless communication over an air interface. Here, the scheduling entity includes means for segmenting a resource group into a plurality of regions, including a first region comprising time-frequency resources for asynchronous channel access and a second region comprising time-frequency resources for synchronous channel access, the resource group comprising a set of time-frequency resources available for wireless communication over the air interface; means for determining a time-frequency resource allocation within the air interface for communication with one or more subordinate entities utilizing each of a plurality of physical communication entities at the scheduling entity; and means for transmitting a signaling message to the one or more subordinate entities, the signaling message configured to indicate the time-frequency resource allocation within the air interface.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
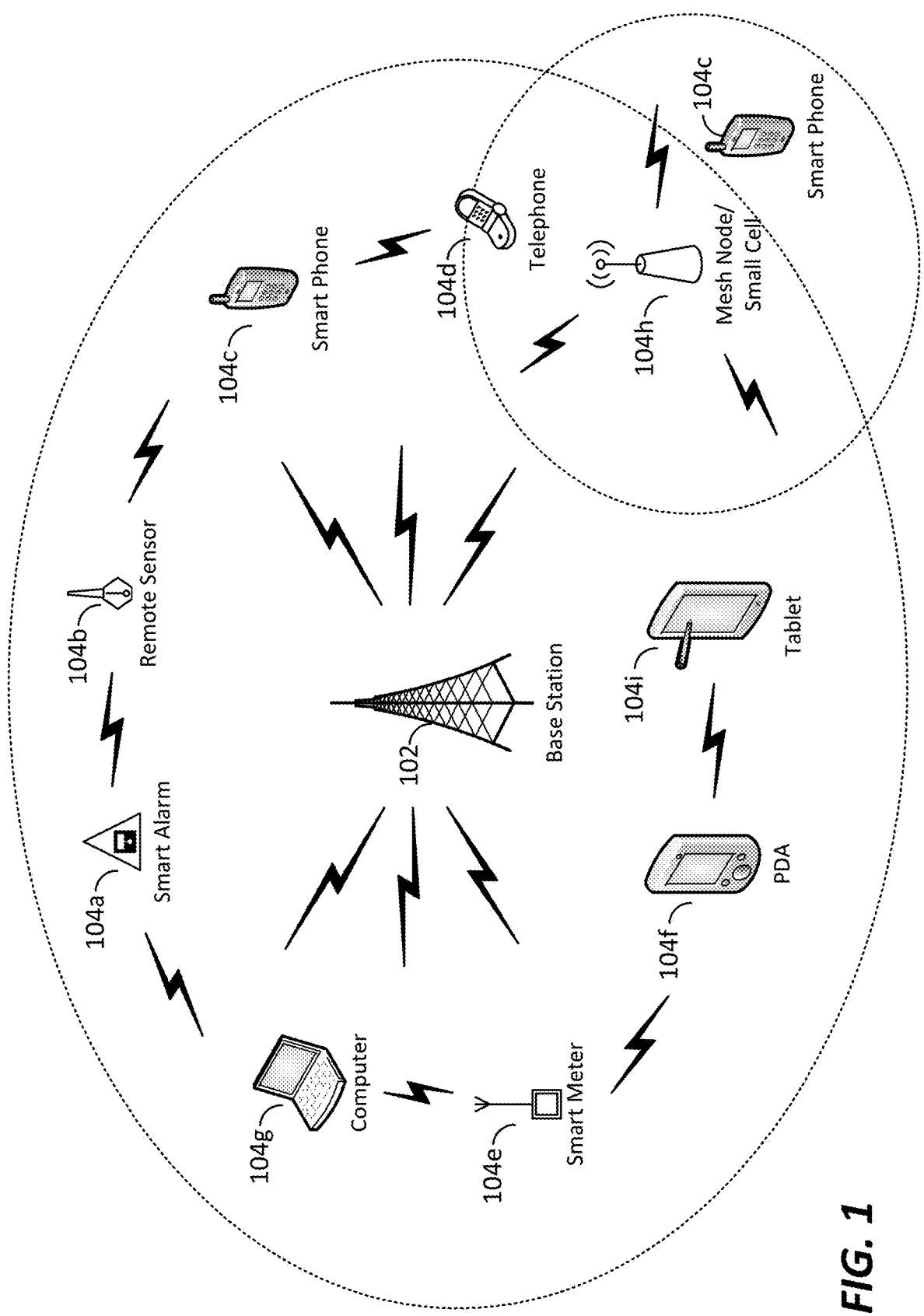
FIG. 1 is a schematic diagram of a wireless communication network according to some embodiments.

FIG. 1 is a schematic illustration of a wireless communication network including multiple communication entities as it may appear in some aspects of the present disclosure. As described herein, a scheduling entity (described in further detail below) may reside in, or be a part of, a base station 102, a smart phone, a small cell, a wireless communication device, or other entity. Subordinate entities or mesh nodes (described in further detail below) may reside in, or be a part of, a smart alarm 104a, a remote sensor 104b, a smart phone 104c, a telephone 104d, a smart meter 104e, a PDA 104f, a personal computer 104g, a mesh node 104h, and/or a tablet computer 104i. Of course, the illustrated devices or components are merely exemplary in nature, and any suitable node or device may appear within a wireless communication network within the scope of the present disclosure. Also, as further discussed below, some wireless communication devices can be both a scheduling entity and a subordinate entity according to some scenarios or communication system design scenarios. Of course such a dual implementation may not occur in all scenarios.

According to various aspects of the present disclosure, a wireless communication network such as the one illustrated in FIG. 1 may utilize numerous different communication schemes, channel access methods, channels, bands, or protocols. Typically, different, incompatible air interface designs may be implemented over the same wireless resources, potentially resulting in unpredictable interference, access problems, and even increased power consumption across the entire network. To bring these various communication schemes together into a unified scheme or model that can address many of these issues, the present disclosure describes a number of aspects of system design and exemplary implementations for a unified air interface (UAI). Broadly, a UAI may provide for flexible temporal/spectral/spatial multiplexing and/or unified control of different physical layer (PHY) technologies and different access modes for a wireless communication medium.

Figure 2:
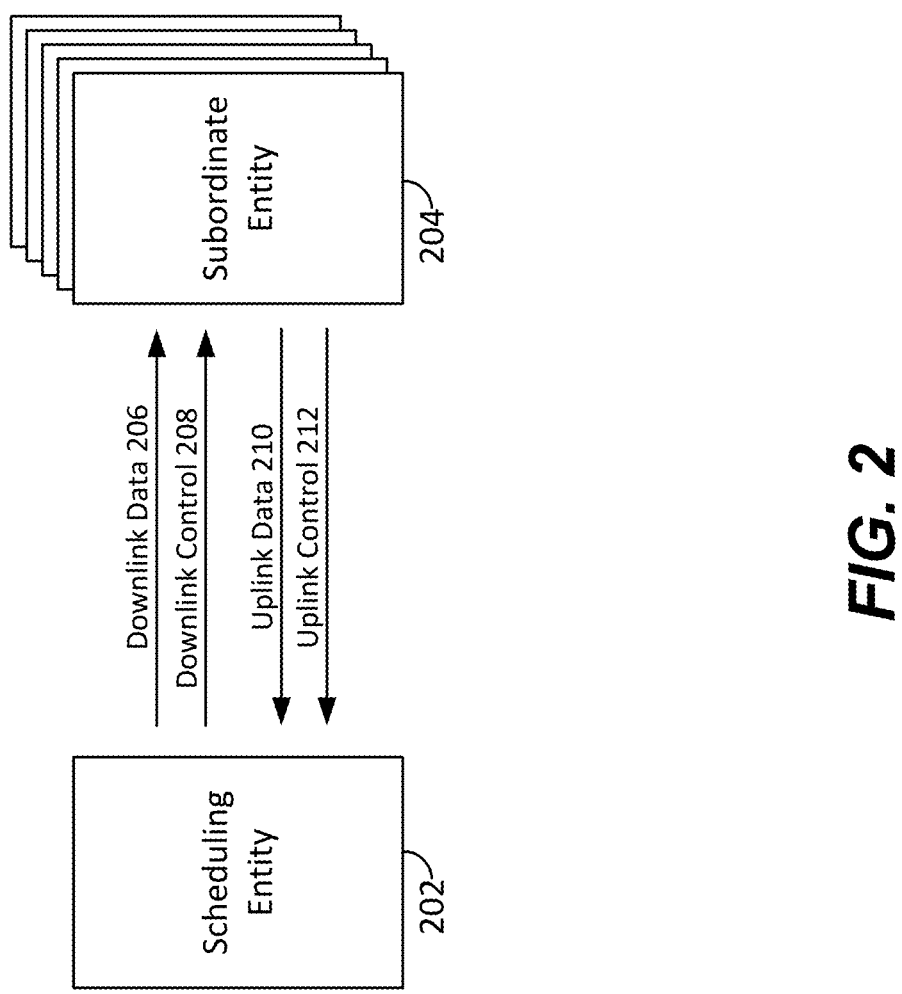
FIG. 2 is a schematic block diagram illustrating a scheduling entity in communication with a plurality of subordinate entities according to some embodiments.

To illustrate some entities or devices described throughout the present disclosure, FIG. 2 is a block diagram illustrating an exemplary scheduling entity 202 in wireless communication with a plurality of subordinate entities 204. While this illustration shows one device or apparatus identified as a scheduling entity, and other devices or apparatuses identified as subordinate entities, in some scenarios, a single device or apparatus can act as both scheduling and subordinate entities with other devices. In other words, it is to be understood that each wireless communication device can be both a scheduling entity and a subordinate entity, at the same time or at different times. These terms are used in a manner to help the reader understand these aspects of the present disclosure and are not meant to be limiting in any manner.

In some scenarios, a scheduling entity 202 can transmit downlink data channel(s) 206 and downlink control channel(s) 208, and subordinate entities 204 can transmit uplink data channel(s) 210 and uplink control channel(s) 212. Of course, the channels illustrated in FIG. 2 are not necessarily all of the channels that may be utilized between a scheduling entity 202 and subordinate entities 204, and those of ordinary skill in the art will recognize that other channels may be utilized in addition to those illustrated, such as other data, control, and feedback channels.

As illustrated in FIG. 2, the scheduling entity 202 may broadcast downlink data 206 to one or more subordinate entities 204. In accordance with aspects of the present disclosure, the term downlink may refer to a point-to-multipoint transmission originating at the scheduling entity 202. Broadly, the scheduling entity 202 can be a node or device responsible for scheduling traffic in a wireless communication network. The traffic can include downlink transmissions and, in some examples, uplink data 210 from one or more subordinate entities 204 to the scheduling entity 202. Another way to describe the scheme may be to use the term broadcast channel multiplexing. A scheduling entity may be, or may reside within, a base station, a network node, a user equipment (UE), an access terminal, or any suitable node in a wireless communication network.

In accordance with aspects of the present disclosure, the term uplink may refer to a point-to-point transmission originating at a subordinate entity 204. Broadly, the subordinate entity 204 is a node or device that receives scheduling control information, including but not limited to scheduling grants, synchronization or timing information, or other control information from another entity in the wireless communication network such as the scheduling entity 202. A subordinate entity may be, or may reside within, a base station, a network node, a UE, an access terminal, or any suitable node in a wireless communication network.

In a network such as the network illustrated in FIG. 1, various devices may act as scheduling entities and/or subordinate entities, and may utilize different frequencies/bands, operate in different environments, or have different service requirements. Under these circumstances, substantial differences can exist in the air interface design, as well as the physical circuitry and control systems used to access the air interface. As the benefits of interconnectedness are being recognized across wide and diverse areas of technology and commerce, more and more systems and networks are being created to provide wireless communication in many different situations. A unified, overarching system design that enables control over, and communication using each of these sets of requirements can enable improved integration and broadly improved user experience.

To this end, a common, scalable signaling structure is provided in certain aspects of the present disclosure. This signaling structure can support multiplexing of different PHY waveforms, different link adaptation schemes, and different ways of accessing the medium (i.e., channel access modes) by any suitable device, e.g., one or more of the wireless communication devices illustrated in FIG. 1. Broadly, channel access modes refer to the channel access method or multiple access method utilized by wireless communication devices for accessing the corresponding air interface resources. Some examples of channel access modes (also referred to herein as access modes) include frequency division multiple access (FDMA), time division multiple access (TDMA), code division multiple access (CDMA), orthogonal frequency division multiple access (OFDMA), carrier sense multiple access (CSMA), listen-before talk (LBT), and various other contention based random multiple access methods, reservation-based (scheduled) channel access, and synchronous and asynchronous channel access modes. Those skilled in the art will recognize that this is an incomplete and non-limiting list of channel access modes, and any suitable channel access mode may be utilized within the spirit and scope of the present disclosure.

Here, the multiplexing of a variety of channel access modes onto a single air interface and under a single MAC could provide for broadly different waveforms, schemes, and access modes within the same spectrum or channel, as needed. However, in some examples, the multiplexing aspect may not be necessary, in the sense that the PHY waveforms may reside on different bands. Still, it would be desirable to have a common control entity (e.g., a media access control or MAC layer) controlling multiple PHYs or multiple PHY modes.

Figure 3:
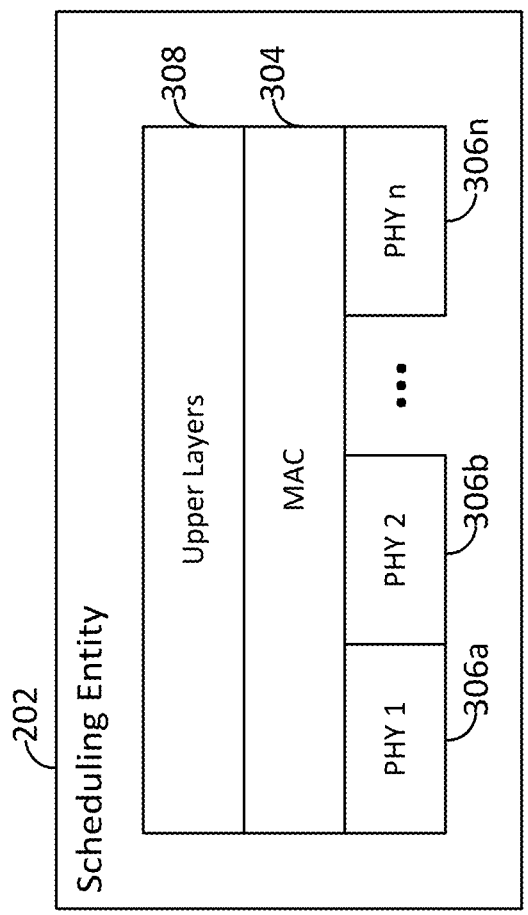
FIG. 3 is a block diagram showing functional layers for wireless communication at a scheduling entity according to some embodiments.

As a simple example, FIG. 3 is a simplified schematic diagram of a scheduling entity 202 having a single MAC layer 304 controlling a plurality of PHY layers 306. Here, each of the PHY layers 306 may correspond to a given physical communication entity, configured to include suitable circuitry, systems, or mechanisms (e.g., radios or transceivers) to enable wireless communication utilizing different frequencies, different communication characteristics, utilizing different PHY waveforms, and/or with different channel access modes. That is, a PHY layer 306 may be a module, circuit, or other physical communication entity configured to implement various physical layer signal processing functions and accessing the air interface, such as determining and implementing a modulation scheme, a transmission frequency, and a channel access mode.

Further, the common MAC layer 304 may include one or more MAC entities, which may be configured to enable dynamic link adaptation among the various PHY layers 306 in accordance with any number of parameters, rules, or mechanisms. That is, the MAC layer 304 or a MAC entity at the MAC layer 304 may provide media access control functions for the wireless communication device, including but not limited to channel access control and a multiple access protocol for each of a plurality of PHY layers 306 and/or physical entities, as described above. In this way, the MAC layer 304 may provide for multiplexing of these different PHYs onto resources of a common air interface. In this way, the MAC layer 304 at the scheduling entity 202 may control various aspects of the communication characteristics with any number of subordinate entities 204, which may each have any of a variety of communication modes, as discussed above and illustrated in FIG. 1. One or more higher layers may reside above the MAC layer 304, represented here as upper layers 308.

The availability of different PHY waveforms and link adaptation mechanisms is desired in part to accommodate differences in the signal bandwidth, signal propagation characteristics, link budgets, processing constraints/requirements, channel conditions, reliability requirements/thresholds, multi-path and Doppler spread combinations, etc., which are desired to be supported in next-generation wireless communication systems. These systems may support large varieties of devices and communication modes, as described above and illustrated in FIG. 1, each of which may utilize different services. For example, some services may use a very small bandwidth, while other services may use an extremely large bandwidth, and link adaptation mechanisms for these services have substantially different requirements. Still, for these services, it is desired to have a common overall system design, both to simplify the implementation and deployment, as well as to enable their control with a single entity at a higher layer. That is, the system is desired to be enabled to achieve reliable communication over very disparate and dynamically changing channel conditions and air interface demands.

In accordance with aspects of the present disclosure, a single system with a unified air interface can accommodate some deployments with very high multipath splitting, as well as other deployments with low multipath. With a unified design, different PHY modes or parameter settings may be viewed as a single network, falling within a single overarching design. Thus, some deployments may be in a low, sub-6-GHz band, while other deployments may be in a millimeter wave (mmW) band, where channel characteristics are very different, necessitating different PHY waveforms, channel access modes, and/or link adaptation mechanisms. In particular, in the mmW band, beamforming may be heavily relied upon, while in the sub-6-GHz band beamforming may be utilized for optimizing capacity or other enhancements, but is not necessarily a fundamentally enabling mechanism. Thus, although the designs would be quite different for such networks, it is still desirable to unify such networks under a common air interface and a common MAC layer 304.

Differing communication environments can also be obtained according to various aspects of the present disclosure. As one example, indoor deployments of wireless communication networks may generally exhibit a small delay spread, wherein a small cyclic prefix may be sufficient, whereas for outdoor deployments it may be desirable to implement a longer cyclic prefix to account for a larger delay spread. Again, although the waveform may be different, it is desired not to be required to design wholly different systems to account for these differences. Still further, spatial and angular selectivity characteristics unique to mmW systems, and those unique to massive MIMO systems (multi-input multi-output) are different than those of sub-6-GHz networks utilizing conventional macrocells or picocells, where a small number of antennas may be used and beamforming may not be used or may be used merely as an enhancement.

The desire to support different channel access modes arises in part from the desire to operate in licensed deployments, unlicensed deployments, and/or shared spectrum deployments, which can have different requirements. Furthermore, infrastructure-based communication, such as networks where an access terminal or user equipment (UE) is in communication with a base station, as well as peer-to-peer/multi-hop/mesh networks, wherein nodes of the same type may communicate with each other (either because the data endpoints are proximate to one another, or because it is desired to rely on multi-hop to connect a remote user terminal to an infrastructure that it does not have direct access to) may be supported. Another reason is that some services require very low latency (e.g., mission critical scenarios), while other services may require extremely low energy operation. Still other services may be more forgiving on those aspects but may desire high throughput. The PHY design for these different requirements would naturally be very different, but there remains a desire to keep them in a single overall, overarching system design. That is, these various air interface protocols may be multiplexed onto a common spectrum, or at least be controlled by a common MAC layer 304.

The availability of a common MAC layer 304 for controlling the different PHY layers can provide a number of benefits or advantages. For example, unified control over a plurality of PHY layers may enable a dynamic allocation of resources to the PHY layers based on traffic demand (or any other suitable parameters), improving trunking efficiency. That is, in some examples, different PHY modes may be multiplexed in the time domain. In particular, dynamic switching between uplink and downlink based on the predominant traffic direction may be enabled at a given time. A system may further wish, for traffic in a single direction (e.g., uplink or downlink), to switch between multiplexing in the time or frequency domain, to support different transmission time intervals (TTIs) that cater to different latency requirements, or to multiplex different symbol numerologies with different delay spread tolerances, etc. To this end, the system may change the allocation of resources to these different modes in a dynamic fashion, based on the current needs. The ability to multiplex heterogeneous PHY waveforms enables a system to dynamically shift the boundary between these different waveforms.

Another application of a common MAC 304 that supports multiple PHYs 306 is to use the mmW band for traffic offloading. One issue with mmW technology is that coverage can be very spotty. Thus, in some examples, the mmW band might be deployed in conjunction with a sub-6-GHz (or other suitable) system. In this way, the mmW band can be used on an opportunistic basis. For example, if a user happens to be within the coverage area of the mmW band, the user can push their data (or most or part of their data) through the mmW band, but when the user leaves that coverage area the user may seamlessly switch back to exclusively using the sub-6-GHz band to maintain connectivity between the source and destination.

Still another application of a common MAC 304 that supports multiplexing multiple PHY modes in the same air interface is that it can enable the transmission of control information relating to one PHY mode, utilizing a different PHY mode. That is, with reference to FIG. 2, downlink control information 208 and uplink control information 212 may be transmitted between entities or nodes in the wireless communication network. Typically, this control information is associated with a downlink data channel 206 and/or an uplink data channel 210. For example, in association with a downlink data 206 transmission, a downlink control 208 transmission may include downlink scheduling information, modulation and coding information, etc. Further, in association with the downlink data 206 transmission, an uplink control 212 transmission may include channel quality information (CQI), an acknowledgment and/or negative acknowledgment (ACK/NACK), etc. Similarly, in association with an uplink data 210 transmission, a downlink control 208 transmission may include uplink scheduling information, modulation and coding information, ACK/NACK information, etc. Further, in association with the uplink data 210 transmission, an uplink control 212 transmission may include scheduling requests or other control information associated with the uplink data 210 transmission.

In accordance with some aspects of the present disclosure, these downlink control 208 transmissions, and/or uplink control 212 transmissions, need not necessarily be transmitted utilizing the same PHY mode as the PHY mode utilized for the transmission of the downlink data 206 transmission. As one example, PHY 1, 306a may be configured for a sub-6-GHz (or other suitable) channel, while PHY 2, 306b may be configured for a mmW channel. Here, PHY 1, 306a may be utilized for transmissions of downlink control 208 transmissions and/or uplink control 212 transmissions, in association with downlink data 206 transmissions made utilizing PHY 2, 306b.

Similarly, in another example, PHY 1, 306a may be configured for a synchronous channel access mode, while PHY 2, 306 b may be configured for an asynchronous channel access mode. Here, PHY 1, 306a may be utilized for transmissions of downlink control 208 transmissions and/or uplink control 212 transmissions, in association with uplink data 210 made utilizing PHY 2, 306b.

Furthermore, such a common MAC layer 304 may enable support for ultra-delay-sensitive applications that are ultra-reliable, potentially alongside other applications without such stringent requirements. These low-delay applications may be described as mission-critical services, where it is extremely important that a package reaches its destination, and that it do so with a very small delay. Accordingly, some aspects of the present disclosure provide for a heterogeneous PHY that utilizes multiple paths between the source and destination. These multiple paths may in some examples traverse different bands, and accordingly, may utilize different PHY layers 306. However, a common MAC 304 is desired to manage all or multiple PHYs to accommodate retransmissions or quick repetitions of packets so that they can reach their destination in a timely manner without consuming extremely large amounts of resources. Thus, it is desired to ensure low delay and high reliability by deploying multiple PHYs in an efficient manner and unifying those PHYs under a common MAC. Thus, the MAC 304 can have complete visibility as to what is going on in each PHY 306, and can manage quick repetitions or retransmissions as needed without causing extremely large overhead to support these services.

In a further aspect of the disclosure, for synchronous communication, the MAC layer 304 may support both sync-scheduled operation as well as sync-autonomous operation. For example, a sync-scheduled MAC can support agile gating mechanisms. That is, the waveform can be switched on and off in an agile matter. This can be useful in both unlicensed and shared spectrum operation, where the waveform may be turned on and off based on coexistence requirements with other technologies or deployments in the same spectrum, as well as for saving power or achieving better spectral efficiency when traffic is very bursty.

Moreover, a sync-autonomous MAC, in contrast with the sync-scheduled MAC, can be useful to fill up time-frequency gaps left by the sync-scheduled operation. That is, data may be sent opportunistically, especially if the data is delay tolerant. Here, if there is a large amount of data to send, but delays in that data are not critical, the system may wait for gaps in the sync-scheduled transmission (which may be used for higher priority traffic), and opportunistically exploit those gaps to send your own transmissions. Sync-autonomous regions may be use different types of MAC control, such as slotted carrier sense multiple access (CSMA), as opposed to sync-scheduled regions, which is based on base station scheduling.

Figure 4:
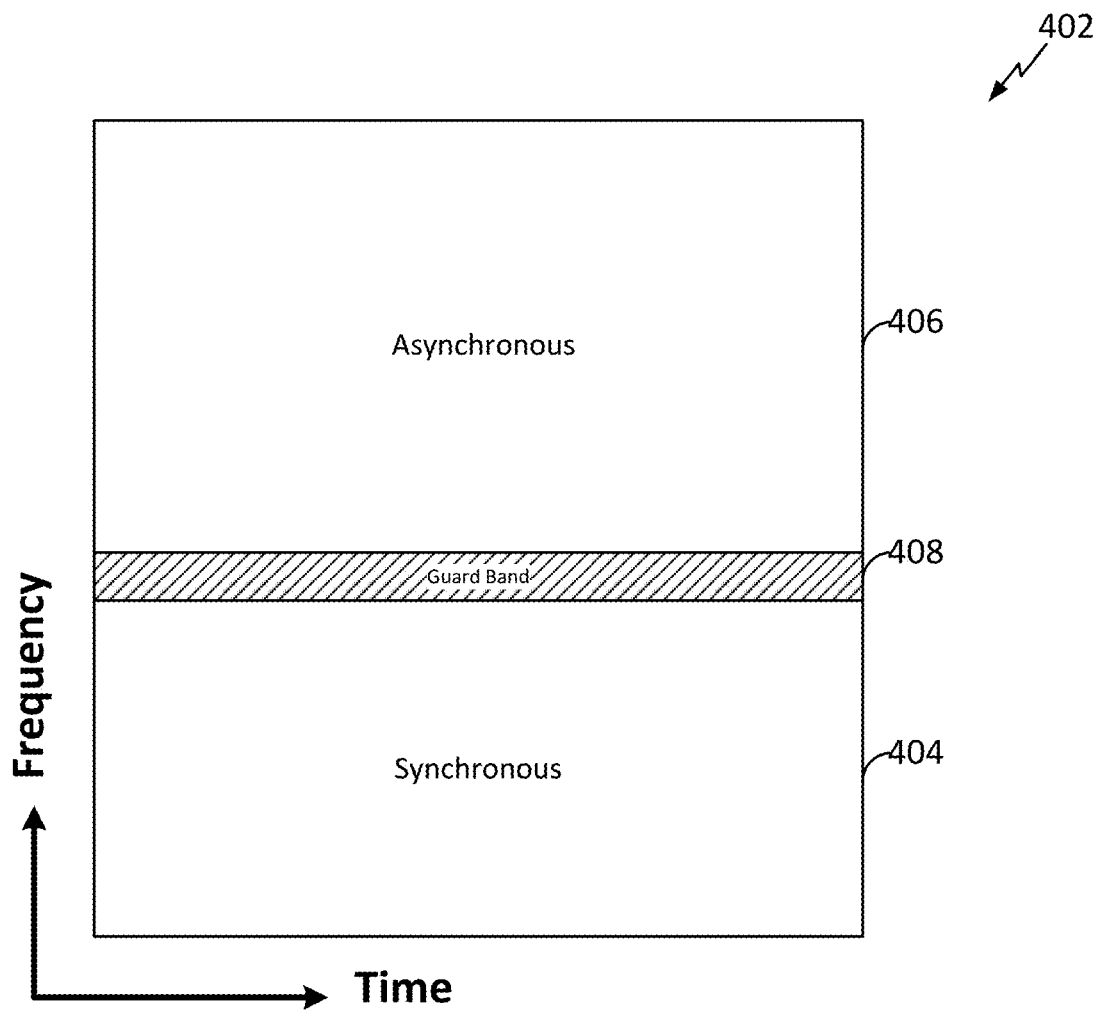
FIG. 4 is a schematic illustration of an air interface being separated between asynchronous and synchronous regions according to some embodiments.

Referring now to FIG. 4, an example is provided generally illustrating the multiplexing of different PHY modes. In FIG. 4, the horizontal dimension illustrates time, while the vertical dimension illustrates frequency. The illustration schematically shows resources corresponding to an air interface as it might be utilized according to some aspects of the present disclosure. In some aspects of the disclosure, the box schematically illustrated in FIG. 4 may represent a resource group 402, or a given set of time-frequency resources that may be utilized for wireless communication utilizing an air interface channel, including any suitable number of PHY modes. This resource group 402 may be subdivided in time and/or in frequency into subsets of resources, where each subset may be utilized by various communication entities (e.g., one or more of the entities illustrated in FIG. 1) for their respective communication schemes.

At the highest level, the resources in the air interface may be divided into a synchronous portion 404 and an asynchronous portion 406. Here, the synchronous region may include channel resources for one or more synchronous channel access methods, where use of the resources by different nodes or entities is generally coordinated to reduce interference with one another. Further, the asynchronous region may include channel resources for one or more asynchronous channel access methods, where use of the resources by different nodes or entities is generally not coordinated between the nodes or entities, such that signals may tend to interfere to some extent with one another (or, in carrier sense or listen-before-talk communication, nodes first check for available resources before using them).

In the illustrated example, this division between the synchronous and asynchronous regions is accomplished in the frequency domain, with the respective asynchronous 406 and synchronous 404 regions occupying different frequency channels, but sharing the time of transmission. As illustrated, the asynchronous region 406 occupies a higher frequency region than the synchronous region 404. However, this arrangement is merely one example. In other examples, other segmentation or separation between the synchronous region 404 and the asynchronous region 406 may be utilized, e.g., by reversing the placement of the asynchronous region and the synchronous region; by utilizing two or more asynchronous regions or synchronous regions; by segmenting or separating the respective regions in the time domain instead of (or in addition to) the frequency domain; etc.

As illustrated, a guard band 408 may be placed between (in the frequency domain) the asynchronous region 406 and the synchronous region 404, to reduce and/or avoid interference between the asynchronous and synchronous regions. In particular, the guard band 408 may reduce or eliminate leakage of the asynchronous region 406 into the synchronous region 404. That is, for example, in the frequency domain, a guard band 408 may be placed between a first portion of spectrum, used for a synchronous channel access mode 404, and another portion of spectrum, used for an asynchronous channel access mode 406. The width of the guard band 408 in the frequency domain may be small or large, depending on the emission characteristics or other details of the waveforms used in a particular implementation. In an example (not illustrated) where the asynchronous region is separated from the synchronous region in the time domain, a guard time may be placed between the synchronous and asynchronous regions to account for any timing uncertainty that may be experienced.

As described in further detail below, the PHY waveforms may be designed or configured so that the guard band 408, or the boundary between the asynchronous region 406 and the synchronous region 404, may be moved or otherwise altered in a flexible manner over a reasonable time scale. For example, the starting frequency, the end frequency, the center frequency, the bandwidth, or any feature of the guard band 408 may be modified as needed according to any suitable set of parameters. In some aspects, described in further detail below, the MAC layer 304 at the scheduling entity 202 (see FIGS. 3 and 10) may semi-statically, semi-dynamically, or dynamically re-allocate or re-partition air interface resources among the asynchronous region 406, the synchronous region 404, and the guard band 408.

Figure 5:
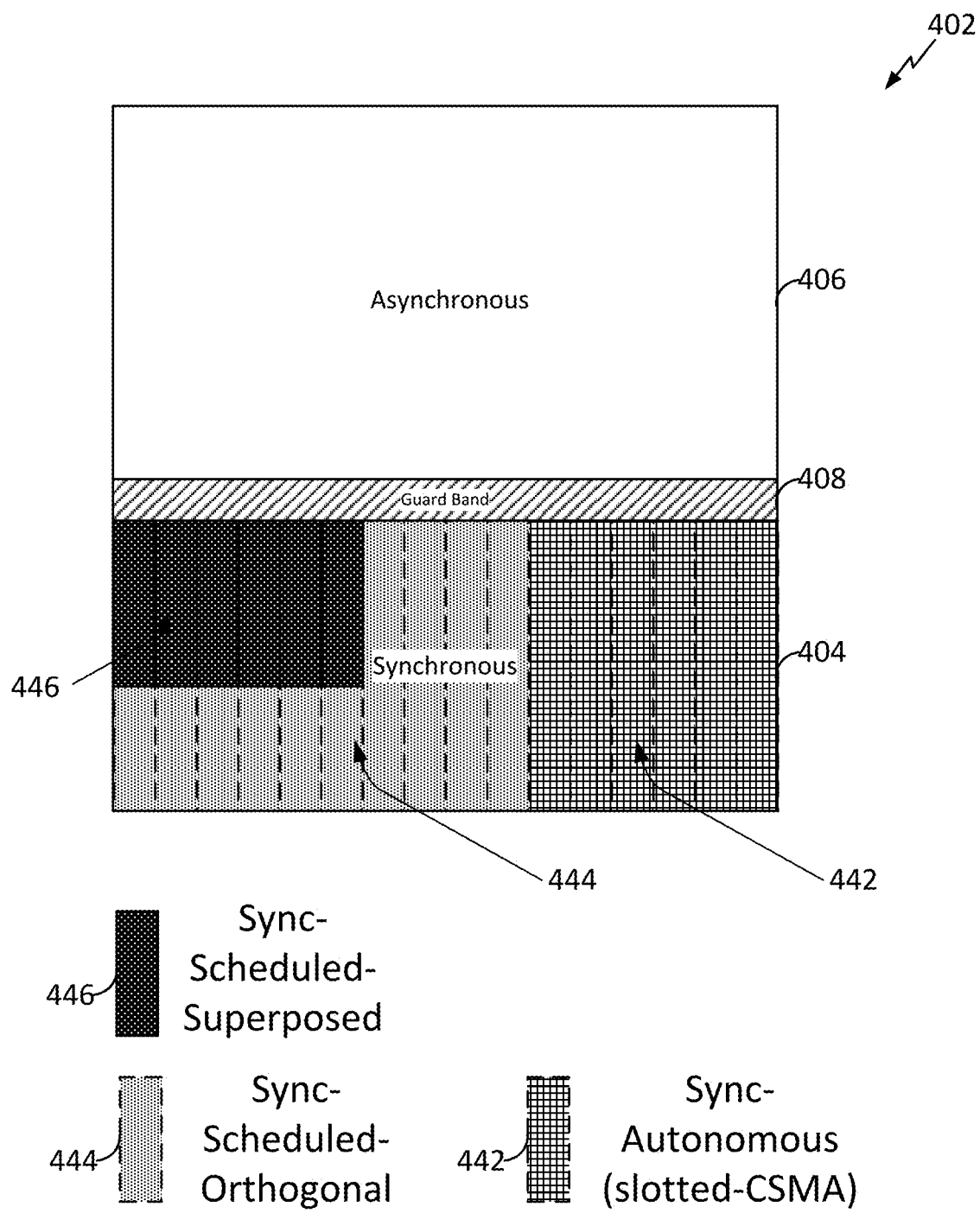
FIG. 5 is a schematic illustration of an air interface having a synchronous region being further separated into scheduled superposed, scheduled orthogonal, and autonomous regions, according to some embodiments.

As illustrated in FIG. 5, within the synchronous region 404, further segmentation or separation of the time-frequency resources in the resource group 402 may be made. In further aspects of the disclosure, the physical layer waveforms within the synchronous region 404 may be designed or configured such that different modes of operation can be multiplexed together in a flexible manner, with partitions or boundaries between respective portions of the synchronous region 404 being configurable or changeable in a semi-static, semi-dynamic, or dynamic fashion, as described further below.

Figure 6:
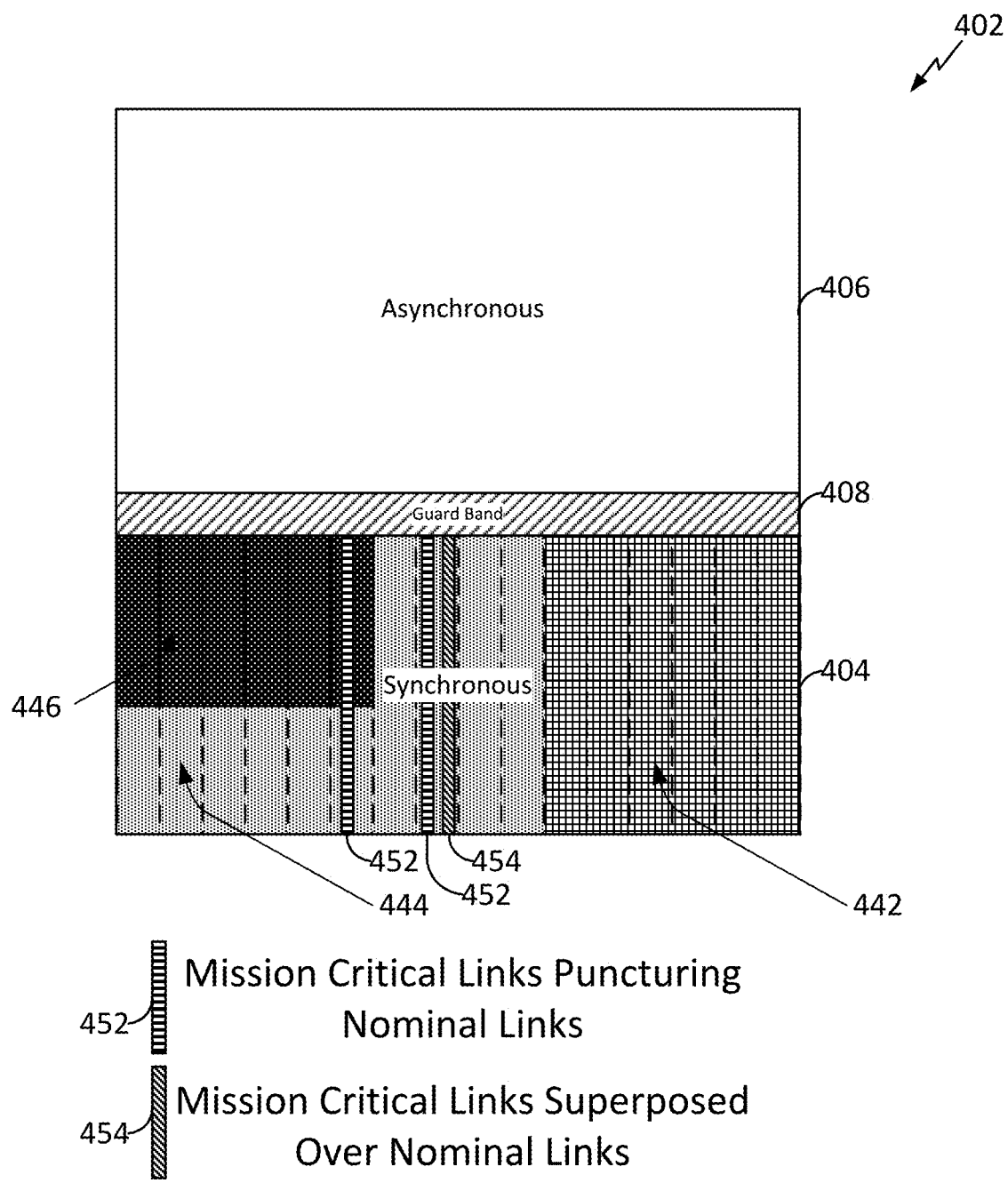
FIG. 6 is a schematic illustration of an air interface having mission-critical transmissions punctured and superposed over nominal links within a synchronous region, according to some embodiments.

In the description that follows, one exemplary segmentation or separation of the synchronous region 404 into sub-regions allocated for different communication schemes is described. However, those of ordinary skill in the art will comprehend that the particular segmentation or separation described below and illustrated in FIGS. 5-6 is merely exemplary in nature, and is not intended to limit the scope of the disclosure to this particular segmentation. That is, this segmentation or separation scheme is included to illustrate some of the aspects of segmenting or separating the synchronous region 404 into sub-regions corresponding to various communication schemes, and within the scope of the disclosure, any suitable segmentation or separation scheme may be utilized.

In some examples, within the synchronous region 404, time-frequency resources may be organized according to resource blocks. Each resource block includes a set of time-frequency resource elements. In the time domain, as illustrated by the vertical dashed lines, the synchronous region 404 may be divided into subframes. Each subframe may generally include a set of one or more symbols. A set of subframes may be referred to as a frame. A set of subframes may include any suitable number of subframes. For example, the number of subframes in a frame may be fixed or may vary depending on the details of a particular implementation.

In some scenarios, a portion of the time-frequency resources corresponding to the synchronous region 404 may be used in a sync-scheduled fashion. The sync-scheduled region may provide high capacity for the bulk transfer of information, or for moderately interactive traffic. This sync-scheduled region may further be suitable for low-latency traffic, such as for highly interactive (e.g., tactile) and mission-critical cases, as described further below in connection with FIG. 6. Some mission-critical cases can include virtual surgeries, autonomous vehicle operations, public protection and disaster relief (PPDR) services such as police, fire departments, and emergency medical services, infrastructure protection and control, etc.

The sync-scheduled sub-region of the synchronous region 404 may be further separated into sub-sub-regions. These can include an orthogonal region 444 and a superposed region 446. Within the sync-scheduled orthogonal region 444, different waveforms may be multiplexed into the same wireless medium in an orthogonal fashion, e.g., such that the waveforms do not collide with one another because they are separated in time and/or frequency.

In another portion of the time-frequency resources corresponding to the sync-scheduled superposed region 446 of the synchronous region 404, different waveforms may be sync-scheduled and superposed with one another. For example, multiple transmissions may be scheduled that occupy the same time-frequency resources within this region. This type of superposition of waveforms is known to those skilled in the art, for example within those technologies that utilize space-division multiple access (SDMA) (e.g., multi-user MIMO or MU-MIMO), where multiple antennas can enable superposition of different transmissions on the same time-frequency resources. That is, the synchronous region 404 may include resources that may be utilized in an orthogonal fashion, wherein multiple transmissions may be superposed over the space, time, and/or frequency dimensions available for the links. Such superposed scheduling can help to improve throughput when the network is experiencing an extremely high SNR, which may not be optimally utilized by the linear degrees of freedom in the system. That is, with superposed scheduling, a scheduling entity 202 can exploit certain nonlinear degrees of freedom, e.g., through successive interference cancellation or other advanced techniques, where more transmissions may be sent than there are time/frequency dimensions to separate. Accordingly, those multiple transmissions may be separated or multiplexed using nonlinear processes that go beyond time, frequency, or space dimensions.

Here, in some aspects of the present disclosure, for the superposed signaling, multiple antennas may be utilized, but in some aspects of the present disclosure, under certain SNR conditions, it may make sense for even a single antenna to be utilized for transmission/reception, wherein more than one waveform may be superposed on the same time-frequency resources. More generally, the number of superposed waveforms on the same time-frequency resources may exceed the number of transmit/receive antennas at the source(s) and destination(s). This is generally known as superposition coding, or non-orthogonal multiple access (NOMA).

In the time domain, a further segmentation or separation of the synchronous region 404 may be implemented. FIG. 5 illustrates an exemplary segmentation or separation between the sync-scheduled region (including the sync-scheduled superposed region 446 and the sync-scheduled orthogonal region 444 in the illustrated example) and a sync-autonomous region 442. For example, the segmentation or separation between the sync-scheduled region (444, 446) and the sync-autonomous region 442 may be set between frames. Partitioning between the sync-scheduled region (444, 446) and the sync-autonomous region 442 in the time domain is merely one example, however, and such partitioning may be made in the frequency domain, or in a combination of the time and frequency domains in other examples. During some time slots or frames, a device may operate in a synchronous scheduled mode, where a base station, eNodeB, or other scheduling entity 102 may schedule packet transmissions. As an example, it may be the case that the scheduling entity 102 runs out of data to send, and there may be a gap corresponding to unused time-frequency resources. Also, other nodes, especially mesh nodes may communicate with their own sources and destinations, in an ad-hoc or autonomous manner. That is, a node may determine that it has a right to utilize the channel, and then may send its transmission based on suitable rules for sharing the medium within the sync-autonomous region 442. In some examples, these rules may be based on a CSMA protocol, a CDMA protocol, ALOHA, or any other suitable protocol.

Within the synchronous region 404, if and when different time-frequency regions are partitioned in the frequency domain, a guard band may be eliminated. For example, as illustrated in FIG. 5, time-frequency resources may be partitioned between two regions, such as the sync-scheduled superposed region 446 and the sync-scheduled orthogonal region 444, with no guard band between these respective regions. Of course, this is merely one option, and in some examples within the scope of the present disclosure a guard band may be utilized between respective regions within the synchronous region 404 according to implementation details.

Referring now to FIG. 6, the partitioning of the synchronous region 404 described above and illustrated in FIG. 5 is illustrated to show the accommodation of data for mission critical links. In some aspects of the disclosure, a scheduling entity 202 and/or a subordinate entity 204 may at essentially any time find a need to send highly delay-sensitive data or mission critical data. According to various aspects of the present disclosure, such an entity may accordingly transmit a puncturing transmission 452 including its delay-sensitive or mission critical data, or in another example, may transmit a superposed transmission 454 including its delay-sensitive or mission critical data.

According to some examples corresponding to the puncturing transmission 452, rather than waiting for an ongoing nominal transmission to end, this mission critical data may puncture the nominal transmission. Here, nominal transmissions are scheduled transmissions utilizing time-frequency resources in the synchronous region. These nominal transmissions may generally utilize a relatively long TTI, although any suitable TTI length may be utilized, and in some examples, two or more different TTIs may be utilized for nominal transmissions. Here, time-frequency resources that were scheduled for sync-scheduled superposed transmission and/or for sync-scheduled orthogonal transmission may be re-allocated to the mission critical function. A previously scheduled transmission may temporarily cease or pause (e.g., it may be punctured), to clear the way for the puncturing transmission 452. In some examples, any information lost corresponding to the previously scheduled and punctured transmission may be recovered through suitable recovery procedures. For example, if such puncturing transmissions are to be expected, the devices may utilize a conservative modulation and coding scheme, enabling error recovery procedures to be implemented. In another example, a suitable retransmission mechanism may be utilized for retransmission of any lost packets.

In some examples, mission critical data may be sent in a superposed transmission 454. This can include, for example, superposed or transmitted together with previously-scheduled nominal transmissions in the sync-scheduled superposed region 446 and/or the sync-scheduled orthogonal region 444. The superposition of the respective transmissions may be made with the understanding that the mission critical or low latency data may cause interference to the nominal transmissions, and the nominal transmissions may cause interference to the superposed transmission 454. This interference may be handled by the respective receiving entities utilizing one or more suitable recovery mechanisms. For example, if such superposed transmissions are to be expected, the devices may utilize a conservative modulation and coding scheme, enabling error recovery procedures to be implemented. In another example, a suitable retransmission mechanism may be utilized for retransmissions of any lost packets.

The delay-sensitive or mission critical data in the puncturing transmissions 452 and/or the superposed transmissions 454 may in some examples be "thin." This transmission may occupy a short transmission time interval (TTI) relative to the TTI used for nominal transmissions such as those described above with respect to FIG. 5. Partitioning between mission-critical and nominal synchronous traffic may be in terms of symbols. And thin transmissions are generally smaller than frames and subframes, and may occupy a short or thin TTI. A thin TTI may span one or two symbols, for example. To compare, multiple symbols may be included in a nominal TTI, which may correspond to a subframe.

In the illustration in FIG. 6, the puncturing transmissions 452 and the superposed transmission 454 are illustrated as spanning the entire frequency range of the synchronous region 404. This is merely one example for illustrating the concept of these respective regions. Those of ordinary skill in the art will recognize the illustrative nature of these examples, and will understand that the puncturing transmissions 452 and the superposed transmission 454 may span any suitable range of frequency within the synchronous region 404, in an amount less than or equal to the entire span of the synchronous region 404. Furthermore, while the puncturing transmissions 452 and the superposed transmission 454 are illustrated as spanning less than one subframe each, these transmissions in various examples may span any suitable length of time, up to or exceeding a subframe in duration.

Figure 7:
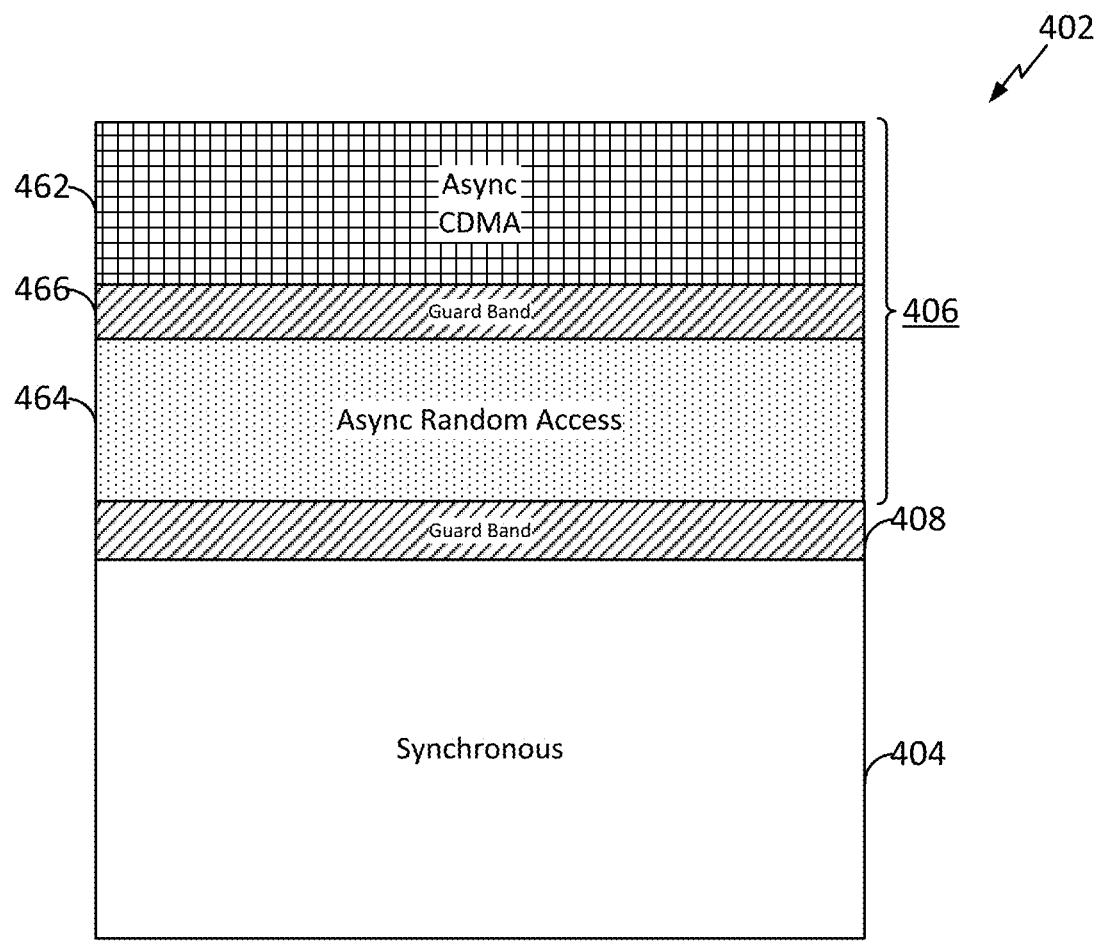
FIG. 7 is a schematic illustration of an air interface having an asynchronous region being further separated into code division multiple access (CDMA) and random access regions, according to some embodiments.

Referring now to FIG. 7, in a further aspect of the present disclosure, the asynchronous region 406 of the resource group 402 may be partitioned to support multiple different channel access modes. The physical layer waveforms within the asynchronous region 406 may be designed or configured such that different modes of operation can be multiplexed together in a flexible manner. Partitions can be between respective portions of the asynchronous region 406 being configurable or changeable in a semi-static, semi-dynamic, or dynamic fashion, as described further below.

Figure 8:
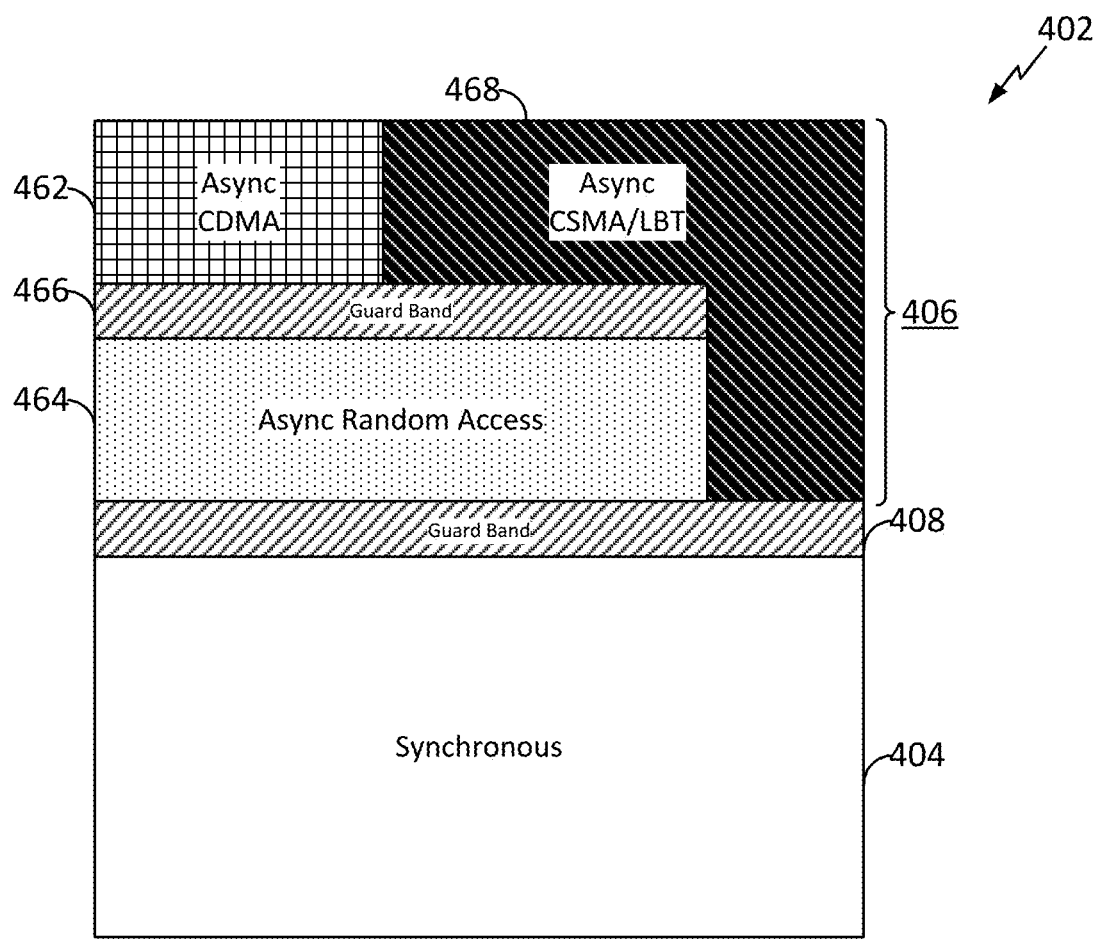
FIG. 8 is a schematic illustration of an air interface having the asynchronous region being further separated into a CDMA region, a random access region, and a channel sense multiple access/listen before talk (CSMA/LBT) region, according to some embodiments.

In the description that follows, one exemplary partitioning of the asynchronous region 406 between different communication schemes is described. However, those of ordinary skill in the art will comprehend that the particular partitioning described below and illustrated in FIGS. 7-8 is merely exemplary in nature, and is not intended to limit the scope of the disclosure to this particular partitioning. That is, this partitioning scheme is included to illustrate some of the aspects of partitioning the asynchronous region 406 between various communication schemes, and within the scope of the disclosure, any suitable partitioning scheme may be utilized.

As illustrated in FIG. 7, different non-orthogonal asynchronous channel access modes such as code division multiple access (CDMA) and random access may be utilized, although any suitable non-orthogonal asynchronous channel access mode may be utilized within the asynchronous region 406 within the scope of the present disclosure. For example, an asynchronous CDMA channel access scheme may occupy an async-CDMA region 462 of the time-frequency resources in the asynchronous region 406. In CDMA, well-known to those skilled in the art, different users occupy the same time-frequency resources, but there is coding and spreading gain sufficient to combat interference caused by other users.

Further, an asynchronous random access scheme may occupy an async-random access region 464 of the time-frequency resources in the asynchronous region 406. In a random access contention-based scheme, also known to those skilled in the art, each user may pick a channel or a portion of the time-frequency resources essentially at random, hoping that no other user picks the same resource. If there are no collisions the packet would successfully get through, but if there were collisions the packet may be retransmitted.

As illustrated, in some examples a suitable guard band 466 may separate the async-CDMA region 462 from the async-random access region 464 of the asynchronous region 406, in an example where these regions are separated from one another in the frequency domain. Of course, the use of the guard band 466 within the asynchronous region 406 to separate different regions with different channel access schemes may be optional, and may be eliminated in some implementations within the scope of the present disclosure. The width of the guard band 466 in the frequency domain may be small or large, depending on the emission characteristics or other details of the waveforms used in a particular implementation. In an example (not illustrated) where the async-CDMA region is separated from the async-random access region in the time domain, a guard time may be placed between the synchronous and asynchronous regions to account for any timing uncertainty that may be experienced.

As described in further detail below, the PHY waveforms may be designed or configured so that the guard band 466, or the boundary between the async-CDMA region 462 and the async-random access region 464, may be moved or otherwise altered in a flexible manner over a reasonable time scale. For example, the starting frequency, the end frequency, the center frequency, the bandwidth, or any feature of the guard band 466 may be modified as needed according to any suitable set of parameters. In some aspects, described in further detail below, the MAC layer 304 at the scheduling entity 202 (see FIGS. 3 and 10) may semi-statically, semi-dynamically, or dynamically re-allocate or re-partition air interface resources among the async-CDMA region 462, the async-random access region 464, and the guard band 466.

Referring now to FIG. 8, in a further aspect of the disclosure, in addition to the non-orthogonal channel access modes described above (e.g., CDMA and random access), orthogonal channel access modes may additionally or alternatively occupy at least a portion of the asynchronous region 406 of the resource group 402. For example, an asynchronous CSMA/LBT (channel sense multiple access, listen before talk) channel access scheme, as exemplified in some conventional Wi-Fi deployments, may occupy an async-CSMA/LBT region 468 of the time-frequency resources within the asynchronous region 406. Broadly speaking, CSMA and LBT refer essentially to the same thing, although a variety of protocols may utilize these schemes with reference to one or the other, such as Wi-Fi, LTE-U in unlicensed bands (LTE-U), HC, etc. These asynchronous CSMA/LBT schemes generally involve sensing or listening to the channel, making a prediction that no other user is utilizing the channel, and accordingly, occupying the channel if the resources are available.

Such asynchronous orthogonal modes may be optimized for coexistence with independent deployments, and may support coexistence with Wi-Fi and LTE-U by utilizing CSMA/LBT protocols. Further, this mode may support random access/ALOHA for short UE bursts (orthogonal if there is no collision), and for internet-of-everything (IOE) mesh transfers.

In the example illustrated in FIG. 8, the asynchronous region is divided into three sub-regions. These can include the asynchronous CDMA region 462, the asynchronous random access region 464, and the asynchronous CSMA/LBT region 468. As illustrated, when the asynchronous random access region 464 is separated from any other sub-region in the frequency dimension, a guard band 466 may be utilized between the asynchronous random access region 464 and the other sub-region or sub-regions. Accordingly, leakage of the random access communication into its adjacent sub-region or sub-regions can be reduced or prevented. Furthermore, the guard band 466 may also protect the asynchronous random access region 464 itself, where access may fail if CDMA or other asynchronous communication leaks into the asynchronous random access region 464. While a particular arrangement of these modes is shown in FIG. 8, this is merely one example, and any suitable arrangement of the respective modes, regions, or sub-regions may be made within the asynchronous region 406, separating the respective sub-regions according to time, according to frequency, or according to a combination of time and frequency.

Figure 9:
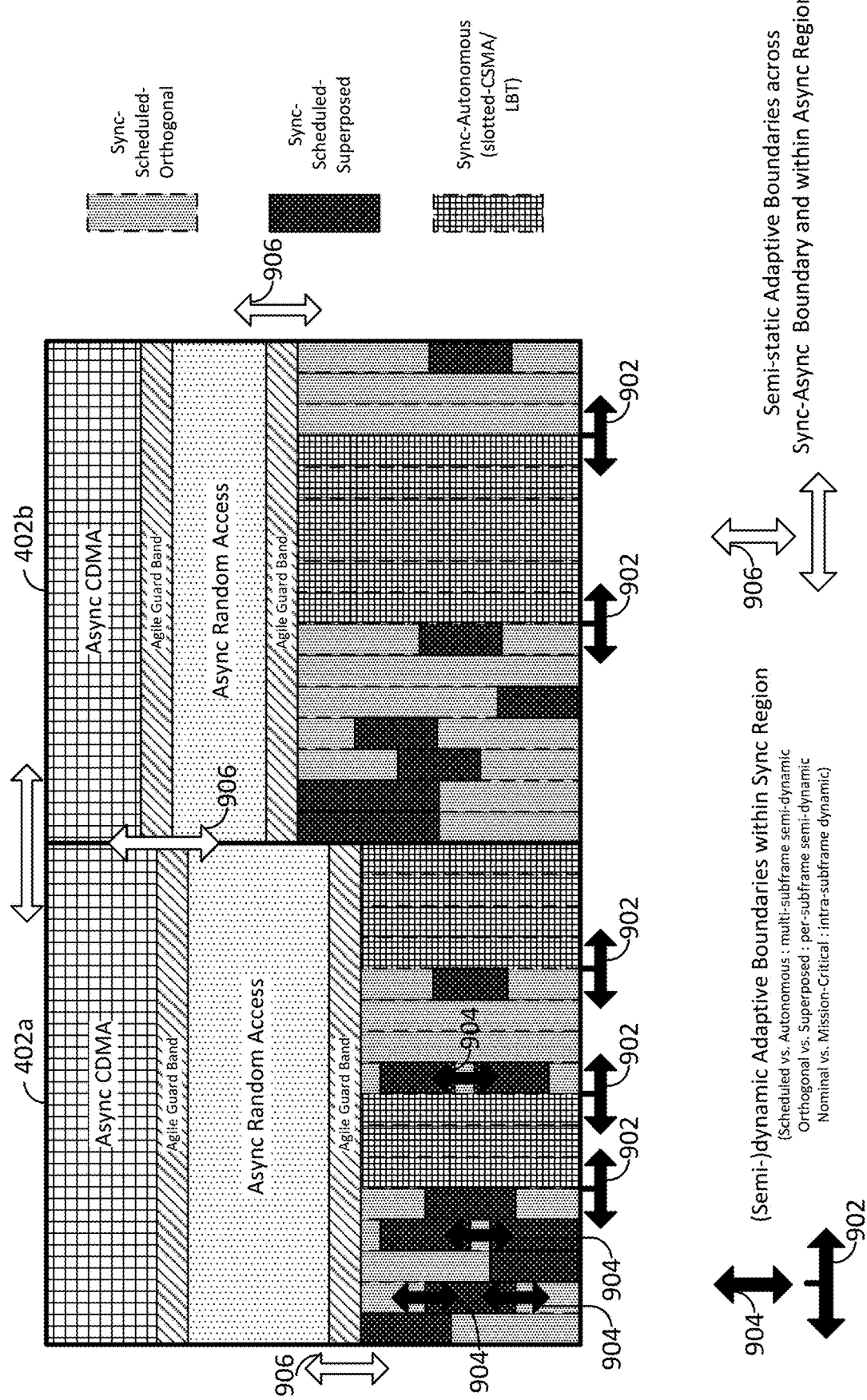
FIG. 9 is a schematic illustration of an air interface with dynamic control over a plurality of PHY waveforms and access modes according to some embodiments.

Moving now to FIG. 9, a schematic diagram is provided illustrating an example putting together several of the above-described modes into a spectrum for use by a wireless communication system and communication devices (e.g. scheduling and subordinate devices). In this illustration, two sequential resource groups 402a and 402b are illustrated. In some examples, time-frequency resources of the air interface may be divided into any number of sequential resource groups 402, and the two resource groups 402a and 402b are merely provided to illustrate the concept of sequential resource groups. According to various aspects of the disclosure, the spectrum illustrated in FIG. 9, including channel access by a plurality of PHY modes, may be controlled by a single MAC layer 304 in a scheduling entity 202 (see FIGS. 3 and 10).

As illustrated, and as described above, each resource group 402a and 402b may include a synchronous region and an asynchronous region. Each of these regions may be further divided into a plurality of sub-regions corresponding to different channel access modes and/or PHY waveforms, as described above. For example, the overall set of time-frequency resources of each resource group 402 may be partitioned into a plurality of sub-bands, sub-portions, or regions, and in each segment or region different PHY waveforms and PHY access modes may be utilized.

In some aspects of the disclosure, a scheduling entity 202 may be configured to control or dynamically move the boundaries between different modes, regions, or sub-regions either on a semi-static basis, a semi-dynamic basis, or a dynamic basis.

For example, partitions or boundaries in the time domain within the synchronous region may be moved on a dynamic (or semi-dynamic) basis. Within the present disclosure, the terms dynamic and semi-dynamic adaptation of a boundary may refer to adaptation of the boundary with a larger or smaller granularity, with semi-dynamic generally referring to a larger granularity (i.e., a slower adaptation) than that of a dynamic adaptation. With reference to FIG. 9, the solid black horizontal arrows 902 symbolize the semi-dynamic adaptive boundaries between scheduled and autonomous sub-regions within the synchronous region of the resource group 402.

Further, frequency-dimension boundaries between scheduled orthogonal modes and scheduled superposed modes within the synchronous region may be reconfigured at the MAC layer 304 of the scheduling entity 202 on a dynamic or semi-dynamic basis. With reference again to FIG. 9, the solid black vertical arrows 904 symbolize the adaptive boundaries between orthogonal and superposed sub-regions within the synchronous region of the resource group 402.

Within the synchronous region, users are generally in active synchronization with the network, so boundaries between sub-regions may be changed without users losing their synchronization. For example, in the illustrated scheme, time-dimension boundaries or subframe boundaries between sync-autonomous and sync-scheduled modes, or frequency-dimension boundaries between sync-scheduled orthogonal and sync-scheduled superposed modes may be adapted or reconfigured at the MAC layer 304 on a dynamic or semi-dynamic basis, in accordance with any suitable factors or parameters available to the MAC layer. A subordinate entity 204 may be notified of any re-allocation of resources or change or adaptation in the boundary in the time or frequency domain between PHY modes by utilizing suitable signaling between the scheduling entity 202 and the subordinate entity 204, e.g., utilizing a suitable downlink control channel 208 (see FIG. 2).

Still further, although FIG. 9 does not illustrate any mission-critical, thin, or short TTI links (see above description in relation to FIG. 6) overriding other resources allocated within the synchronous region. However, in various aspects of the disclosure, the MAC layer 304 may override an existing resource allocation, and the location of these mission-critical links and their boundaries with nominal transmissions (e.g., within orthogonal, superposed, and/or autonomous PHY modes) may be reconfigured at the MAC layer 304 on a dynamic (e.g., intra-subframe) basis.

In a further aspect of the disclosure, the scheduling entity 202 may move or adapt various boundaries within the asynchronous region 406 on a semi-static basis. That is, these boundaries may be fixed for a predetermined or extended period of time, such as for a plurality of frames. In some examples, the boundaries or set of scheduled resources within the asynchronous region 406 for a given resource group 402 may be changed by way of broadcast signaling from the scheduling entity 202 to the entire set of entities in communication with the scheduling entity 202, as described further below. That is, users operating under an asynchronous PHY mode may not listen for or track changes in resource allocation very regularly, and accordingly a relatively large time scale (relative to the semi-dynamic and dynamic adaptations described above in the synchronous region) for boundary changes in the asynchronous region 406 may be utilized. In this way, all users of resources in the asynchronous region 406 can update and recognize new configurations according to information carried in the broadcast signaling. In another example, semi-static boundary changes in the asynchronous region may be performed in accordance with a schedule (e.g., a predetermined schedule) known to the scheduling entity 202 and the subordinate entities 204. With reference to FIG. 9, the white vertical arrows 906 symbolize some of the semi-static adaptive boundaries that may be modified utilizing broadcast signaling on a semi-static basis. For example, boundaries in the frequency domain between the asynchronous CDMA and asynchronous random access regions within the asynchronous region of the resource group 402 may be modified as described. Here, not only the boundaries of the asynchronous CDMA region and the asynchronous random access region themselves may be adapted, but additionally or alternatively, the boundaries of the guard band between these regions may be adapted on a semi-static basis as described above.

Further, the boundaries in the frequency domain between the synchronous and asynchronous regions, including the location and width of a guard band between these regions (if used) may be altered utilizing broadcast signaling on a semi-static basis. For example, broadcast signaling may be transmitted from a scheduling entity to a subordinate entity to make alterations or changes to the boundaries between the synchronous and asynchronous regions, and any guard band in between, on a semi-static basis. In a further example, the boundary in the time domain between sets of subframes, and the length of frames, may additionally be adapted or adjusted on a semi-static basis, e.g., utilizing broadcast signaling as described above.

In a still further example, the boundaries in the time domain between resource groups 402, and/or even the duration or length of given resource groups 402, may be controlled utilizing broadcast signaling on a semi-static basis. With reference to FIG. 9, the white horizontal arrows 908 symbolize a semi-static adaptive boundary between resource groups 402a and 402b, representing that this boundary may be semi-statically controlled utilizing broadcast signaling as described.

Figure 10:
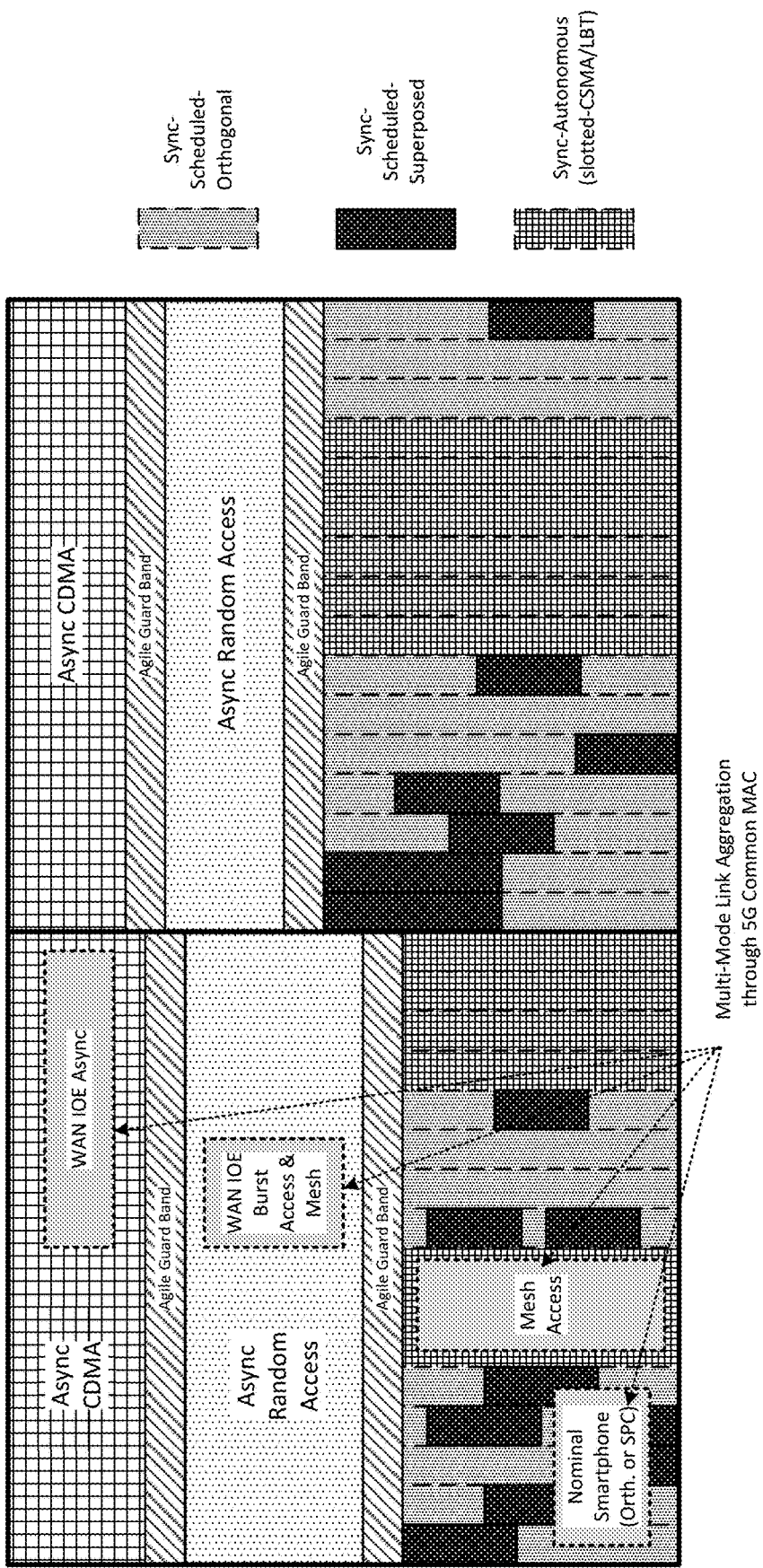
FIG. 10 is a schematic illustration of an air interface showing examples of usage modes according to some embodiments.

Referring now to FIG. 10, a schematic diagram is provided to illustrate a further example of time-frequency resource sharing within a series of resource groups. In FIG. 10, labels are included to illustrate some examples of types of traffic that might use the given regions described above. These examples are merely illustrative in nature to help to better understand some of the concepts in the present disclosure, and those of ordinary skill in the art will readily comprehend that other types or categories of traffic may utilize the given regions or sub-regions of a given resource group.

In the illustrated example, as illustrated in FIG. 10, communication between a smart phone and infrastructure may be allocated nominal resources within the sync-scheduled region of a series of resource groups. A mesh node may utilize the sync-autonomous region, and/or the asynchronous regions.

The asynchronous portions may be used by a terminal or leaf nodes in a mesh system that includes power-constrained devices that are exempt from synchronization requirements and may transmit in an asynchronous manner. Higher level nodes in a mesh network may use synchronous mode of operation. They may typically use the sync-autonomous portion.

The WAN IOE refers to the Internet of everything, using a wide area network. A LAN IOE network may be defined, for example, by IEEE standards. The WAN IOE may support the IOE over a wide geographic area including outdoor deployments. This example of communication traffic may be utilized to support automotive uses, smart home uses, smart city uses, and even smart watch or other wearable technology. Automotive uses might include in-car connectivity, environment sensing and interaction, enhanced driver efficiency and safety, etc. Smart home uses might include connected home technology that can enable smart sensors, home automation, energy conservation, etc. Smart cities uses might include in-building networks, smart energy grids, biometric monitoring systems, etc.

Figure 11:
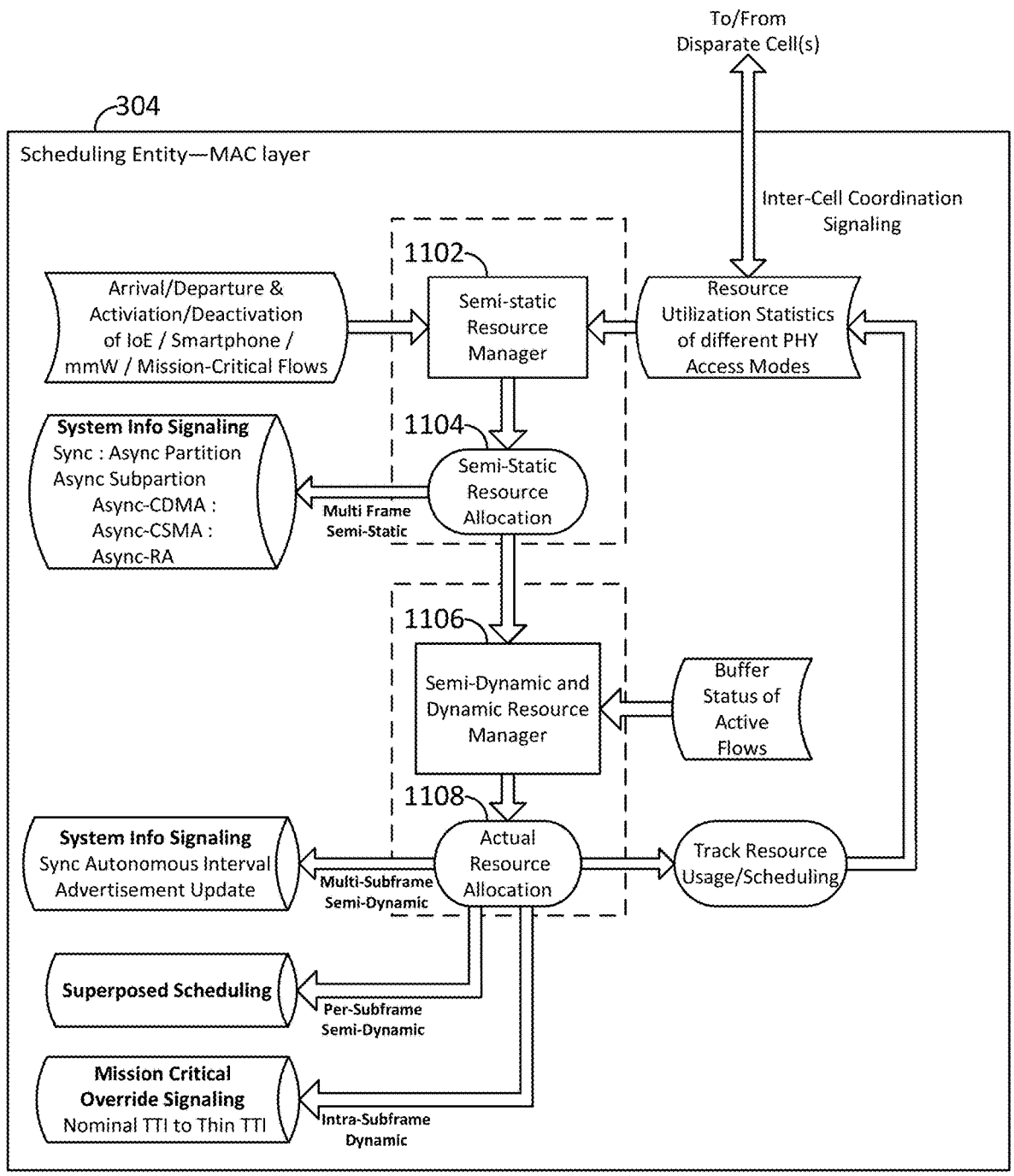
FIG. 11 is a block diagram illustrating resource management and allocation entities within a MAC entity according to some embodiments.

To enable these semi-static, semi-dynamic, and dynamic adaptations of the boundaries between regions and sub-regions in a resource group, in various aspects of the present disclosure, the MAC layer 304 at the scheduling entity 202 (see FIG. 3) may include a resource manager. FIG. 11 is a schematic diagram illustrating some of the functional components for a resource manager within a MAC layer 304 for supporting a unified air interface (UAI) as described above, according to some examples within the scope of the present disclosure. Here, the functional blocks in FIG. 11 may reside within a MAC entity or MAC layer 304 within a scheduling entity 202. The scheduling entity 202 may reside within, be a component of, or be a base station, a user equipment, a femtocell, or any other suitable network node in a wireless communication network.

In general, the resource manager illustrated in FIG. 11 may be utilized to provide certain downlink control transmissions 208 (see FIG. 2). For example, as described in further detail below, one or more of the outputs of the resource manager may be a resource allocation for time-frequency resources in a resource group. Here, a downlink control transmission 208 may include a grant or other suitable scheduling information transmitted to one or more subordinate entities, indicating the resource allocation. In various aspects of the disclosure, these control transmissions 208 may be made utilizing any suitable PHY layer 306 (see FIG. 3), not necessarily limited to the PHY layer 306 to which the control transmission 208 applies. For example, the resource manager may determine to schedule time-frequency resources for a first PHY layer 306a to utilize within a synchronous region 404 of a resource group 402. Here, the resource manager may transmit control information including scheduling information for the first PHY layer 306a to utilize, where the control information may be transmitted utilizing the first PHY layer 306a, a second PHY layer 306b, or any other PHY layer.

Referring to FIG. 11, at the top level is illustrated a semi-static resource manager 1102. As illustrated, the semi-static resource manager 1102 may take, as input parameters, information about inter-cell coordination, resource utilization statistics of different PHY access modes, and arrival/departure and activation/deactivation of flows. This information may in various examples be gathered by the scheduling entity 202 utilizing suitable signaling from subordinate entities 204, signaling from other scheduling entities (e.g., inter-cell coordination signaling), or from the scheduling entity 202 itself monitoring the utilization of the resources in the air interface.

Inter-cell coordination signaling may include a variety of information signaled between cells. For example, such inter-cell coordination signaling may include a request for, or a grant of, radio resources associated with a region to or from a neighboring cell. Inter-cell coordination signaling may also include a report of past or intended resource usage for particular regions by a cell, to its neighboring cells. For example, if a given region is very crowded while other regions are not very crowded, then clearly, it would be beneficial to allocate more resources to the crowded region, so that it will not run out of capacity, without affecting less crowded regions.

Further, resource utilization statistics may include a variety of statistics relating to the utilization of each of the PHY modes in use. For example, the proportion of each resource group allocated to each PHY mode, or the proportion of a given region of a resource group allocated to various PHY modes, may be among resource utilization statistics gathered. Further, amounts of resources utilized over a given amount of time, not necessarily limited to a particular resource group, may be among resource utilization statistics gathered.

Still further input into the semi-static resource manager 1102 may be in the form of information about the arrival or departure of flows utilized by various subordinate entities, as well as the activation or deactivation of existing flows utilized by various subordinate entities. Here, the flows from which this information may be generated may be of different kinds, such as internet of everything (IOE) devices like sensors; smart phones that can be high throughput and may consume large amounts of data; mmW flows with extremely large throughput; or mission-critical flows that may demand extremely low latency, as just some examples. For example, if a new flow is initiated within a resource group 402, the semi-static resource manager 1102 may adapt the allocation of resources to accommodate this new flow. Accordingly, the semi-static resource manager 1102 may alter or adapt boundaries between various regions or sub-regions of the resource group 402 to accommodate the new mission-critical flow without adversely affecting other flows. Thus, the resource partition may be suitably re-adjusted between synchronous and asynchronous, autonomous and scheduled, etc., as illustrated in FIG. 9.

In a similar example, if an existing flow within a resource group 402 is terminated or deactivated, the semi-static resource manager 1102 may in some examples adapt the allocation of resources to fill the resource group with other, existing flows, or may otherwise alter or adapt the boundaries of regions or sub-regions of the resource group 402 to accommodate the existing and/or expected flows.

By utilizing these input parameters, the semi-static resource manager 1102 may place the boundaries between different regions or sub-regions that cannot easily (or at all) be moved very quickly. As one example, the semi-static resource manager 1102 may adjust semi-static resources on the order of once every several hundred ms. For example, the boundary between synchronous and asynchronous regions, and the guard band between them (if used); and boundaries between different sub-regions within the asynchronous region, and the guard band between them (if used) may be semi-static in nature.

The semi-static resource manager 1102 may provide its decisions to a semi-static resource allocation entity 1104. In some aspects of the disclosure, in accordance with input from the semi-static resource manager 1102, the semi-static resource allocation entity 1104 may advertise the decisions of the semi-static resource manager 1102 utilizing system information signaling. Here, this system information signaling may correspond to a downlink control 208 transmission, utilizing one or more suitable PHY layers 306, as described above. As a descriptive example, LTE and other 3GPP networks broadcast system information block (SIB) messages, which may be considered the same or similar to the system information signaling described herein. In an aspect of the present disclosure, the signaling of these SIBs may be utilized to inform nearby users of the air interface which portions of the spectrum are assigned for synchronous and asynchronous regions, and within the asynchronous region, which portions are assigned to the different PHY waveforms or channel access modes such as CDMA, CSMA, random access, etc. These decisions may stay valid over multiple frames, being changed on a semi-static basis. That is, in some aspects of the disclosure, the transmissions of the system information (e.g., SIB signaling) may be made according to an interval corresponding to a plurality of transmission frames. Subordinate entities or other devices utilizing the air interface may monitor for these scheduled SIB broadcasts to receive information about the regions or sub-regions within a given resource group, including semi-static adaptations to the boundaries between the respective regions or sub-regions.

In a further aspect of the disclosure, the semi-static resource allocation made in accordance with information from the semi-static resource manager 1102 may be taken into account by a semi-dynamic/dynamic resource manager 1106. In some aspects, as a further input beyond that from the semi-static resource allocation entity 1104, the semi-dynamic/dynamic resource manager 1106 may take into account the buffer status of active flows. That is, the semi-dynamic/dynamic resource manager 1106 may take into account the current buffer status at the scheduling entity 202, or how much data is in a buffer or queue in memory at the scheduling entity 202 corresponding to the flow.

The semi-dynamic/dynamic resource manager 1106 may provide its decisions to a semi-dynamic/dynamic resource allocation entity 1108. In some aspects of the disclosure, in accordance with input from the semi-dynamic/dynamic resource manager 1106, the semi-dynamic/dynamic resource allocation entity 1108 may advertise the decisions of the semi-dynamic/dynamic resource manager 1106 utilizing one or more suitable signaling messages. Here, these signaling messages may correspond to a downlink control 208 transmission, utilizing one or more suitable PHY layers 306, as described above. That is, based on the buffer status of the active flow or flows, and the parameters received from the semi-static resource allocation entity 1104, the semi-dynamic/dynamic resource manager 1106 may provide information to a semi-dynamic/dynamic resource allocation entity 1108, which may make an actual resource allocation for use by one or more subordinate entities. This resource allocation may be considered a revision or a refinement of the resource allocation from the semi-static resource manager 1102/1104.

The semi-dynamic/dynamic resource allocation entity 1108 may in various examples convey the decisions made by the semi-dynamic/dynamic resource manager 1106 by way of suitable signaling messages. For example, resource allocations may be communicated utilizing system information broadcasts; utilizing superposed scheduling information transmissions; and/or utilizing mission critical override signaling transmissions, as described in further detail below. Here, as described above, each of these system information broadcasts, superposed scheduling, and/or mission critical override signaling transmissions may correspond to a downlink control 208 transmission, utilizing one or more suitable PHY layers 306.

For example, in some aspects of the disclosure, relatively slow changes, adaptations, or alterations to allocated resources (e.g., semi-dynamic adaptations on a multi-subframe interval) may be communicated utilizing system information broadcast signaling, as described above in relation to the semi-static resource manager 1102 (e.g., utilizing SIB broadcasts). Here, the system information broadcast signaling may in some examples be transmitted not as infrequently as the semi-static basis, which may last for several frames, but may be changed over a smaller time granularity, e.g., corresponding to a set of two or more subframes. That is, in some aspects, broadcasts of system information may take place on a less frequent basis, in the case of semi-static or multi-frame resource allocation, and/or on a more frequent basis, in the case of semi-dynamic or multi-subframe resource allocation. The resource allocation indicated in these transmissions may in some examples include a sync-autonomous interval. Here, the sync-autonomous interval may refer to a time or a frequency when the sync-scheduled region (i.e., the sync-scheduled superposed region 446 and/or the sync-scheduled orthogonal region 444) starts or stops, so that the remainder of the time slots or frequency resources may be used for a sync-autonomous mode of transmission 442.

In a further aspect, the semi-dynamic/dynamic resource allocation entity 1108 may allocate resources within a sync-scheduled superposed mode (described above, e.g., in relation to FIG. 5) on a per-subframe or semi-dynamic basis. That is, in some aspects of the present disclosure, the term semi-dynamic scheduling may refer to two different time scales: e.g., multi-subframe (as with the system information signaling for sync-autonomous intervals) and per subframe (as with signaling for superposed scheduling). Thus, the scheduling entity 202 may transmit suitable signaling (e.g., superposed scheduling information) configured to indicate adaptations, changes, or alterations in resources corresponding to the sync-scheduled superposed region 446 on a semi-dynamic basis, e.g., at each subframe. Here, the per-subframe signaling for semi-dynamic scheduling of the sync-scheduled superposed mode may be made in the form of unicast transmissions, addressed to particular users of the superposed region of the resource group.

In a still further aspect, the semi-dynamic/dynamic resource allocation entity 1108 may allocate resources for mission critical or override flows on an even faster timescale, e.g., at intervals less than a subframe (i.e., intra-subframe signaling). This mission-critical override signaling can be made on an intra-subframe, or a very dynamic basis. Thus, the scheduling entity 202 may transmit suitable signaling configured to indicate a mission critical override of previously allocated time-frequency resources on a dynamic basis, e.g., based on a thin or short transmission time interval (TTI). As one example, the dynamic transmission of mission critical override signaling may be made as quickly as a per-symbol basis.

In various aspects, the mission critical override signaling provided from the resource allocation entity 1108 may be broadcast or unicast, depending on the efficiency needed. For example, the scheduling entity 202 may send a broadcast signal to inform the network that a given mission critical signal may step on or interfere with one or more nominal transmissions. However, the scheduling entity 202 may send a unicast signal to inform a particular user that it has been granted resources, e.g., on a short or thin TTI basis, for mission critical, low latency signaling.

While allocating resources, the semi-dynamic/dynamic resource allocation entity 1108 may in some examples track resource usage of the air interface. Here, in some aspects of the disclosure, the semi-dynamic/dynamic resource allocation entity 1108 may provide this resource usage information to the semi-static resource manager 1102. In this way, as described above, the semi-static resource manager 1102 may then adjust the more rigid boundaries within a resource group on a semi-static timescale.

Figure 12:
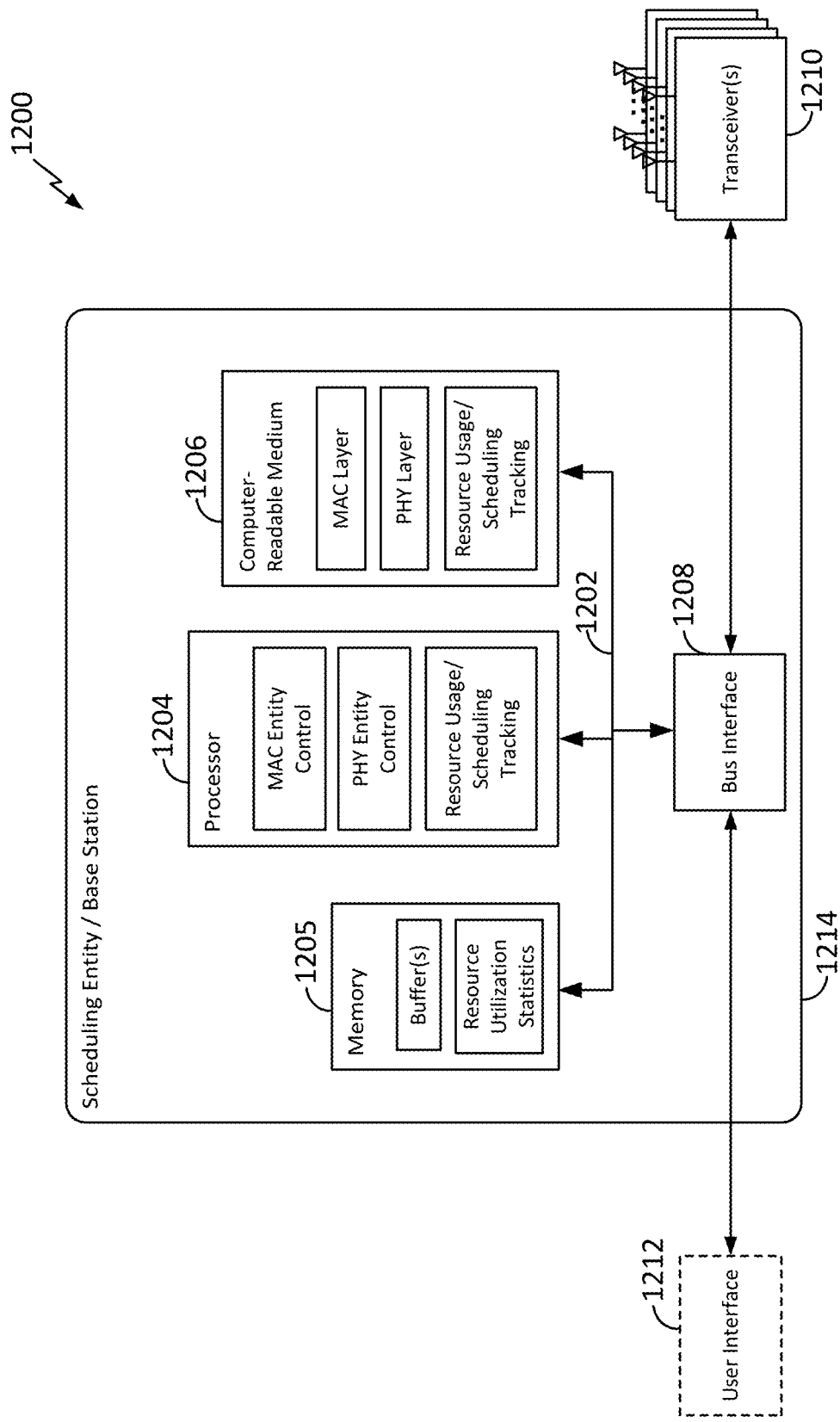
FIG. 12 is a block diagram illustrating an example of a scheduling entity configured for wireless communication according to some embodiments.

FIG. 12 is a conceptual diagram illustrating an example of a hardware implementation for an apparatus 1200 employing a processing system 1214. In accordance with various aspects of the disclosure, an element, or any portion of an element, or any combination of elements may be implemented with a processing system 1214 that includes one or more processors 1204. For example, the apparatus 1200 may be a scheduling entity, base station (BS), or any other suitable network node, as illustrated in of FIGS. 1, 2, 3, and/or 11. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 1204, as utilized in an apparatus 1200, may be used to implement any one or more of the processes described above.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 links together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and one or more transceivers 1210. The transceivers 1210 provide means for communicating with various other apparatus over a transmission medium. In various examples, the transceivers 1210 may include one or more antennas, and in multi-antenna examples, may be enabled to determine an angle from which a received signal arrives, or for beamforming of transmitted signals. The transceiver 1210 may include various sub-components configured to enable wireless communication, including but not limited to one or more power amplifiers, a transmitter, a receiver, filters, oscillators, etc. In some examples, a plurality of transceivers 1210 may correspond to the plurality of PHY layers or physical communication entities 306 (see FIG. 3). That is, as described above, the MAC layer or MAC entity controller may provide for unified control over a plurality of physical communication entities 306 or transceivers 1210. In additional examples, a transceiver 1210 may itself include two or more physical communication entities 306. Further, depending upon the nature of the apparatus, a user interface 1212 (e.g., keypad, display, speaker, microphone, joystick) may also be provided.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The computer-readable medium 1206 may also be used for storing data that is manipulated by the processor 1204 when executing software.

In various aspects of the disclosure, the processor 1204 may include circuitry configured to control one or more MAC entities at the MAC layer 304 (e.g., according to FIG. 11), and circuitry configured to control one or more physical communication entities at the PHY layers 306 (see FIG. 3). Further, the processor 1204 may include circuitry configured to track time-frequency resource usage and time-frequency scheduling over time, for use at a MAC entity of the MAC layer 304 as an input to the semi-static resource manager 1102, described above in relation to FIG. 11. In some examples, each of these circuits may operate in coordination with software stored on the computer-readable medium, including code for carrying out instructions to cause the processor 1204 to implement the functions described herein.

In some aspects of the disclosure, the memory 1205 may include one or more buffers or queues for buffering data packets for flows corresponding to various regions or sub-regions of a resource group. Further, the memory 1205 may include storage for various resource utilization statistics, for usage by the semi-static resource manager 1102 as described above in relation to FIG. 11.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206. The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In various aspects of the disclosure, the computer-readable medium 1206 may include software configured to control the MAC layer 304 (e.g., according to FIG. 11), and software configured to control the PHY layers 306 (see FIG. 3). Further, the computer-readable medium 1206 may include software configured to track time-frequency resource usage and time-frequency scheduling over time, for use at the MAC layer 304 as an input to the semi-static resource manager 1102, described above in relation to FIG. 11.

Figure 13:
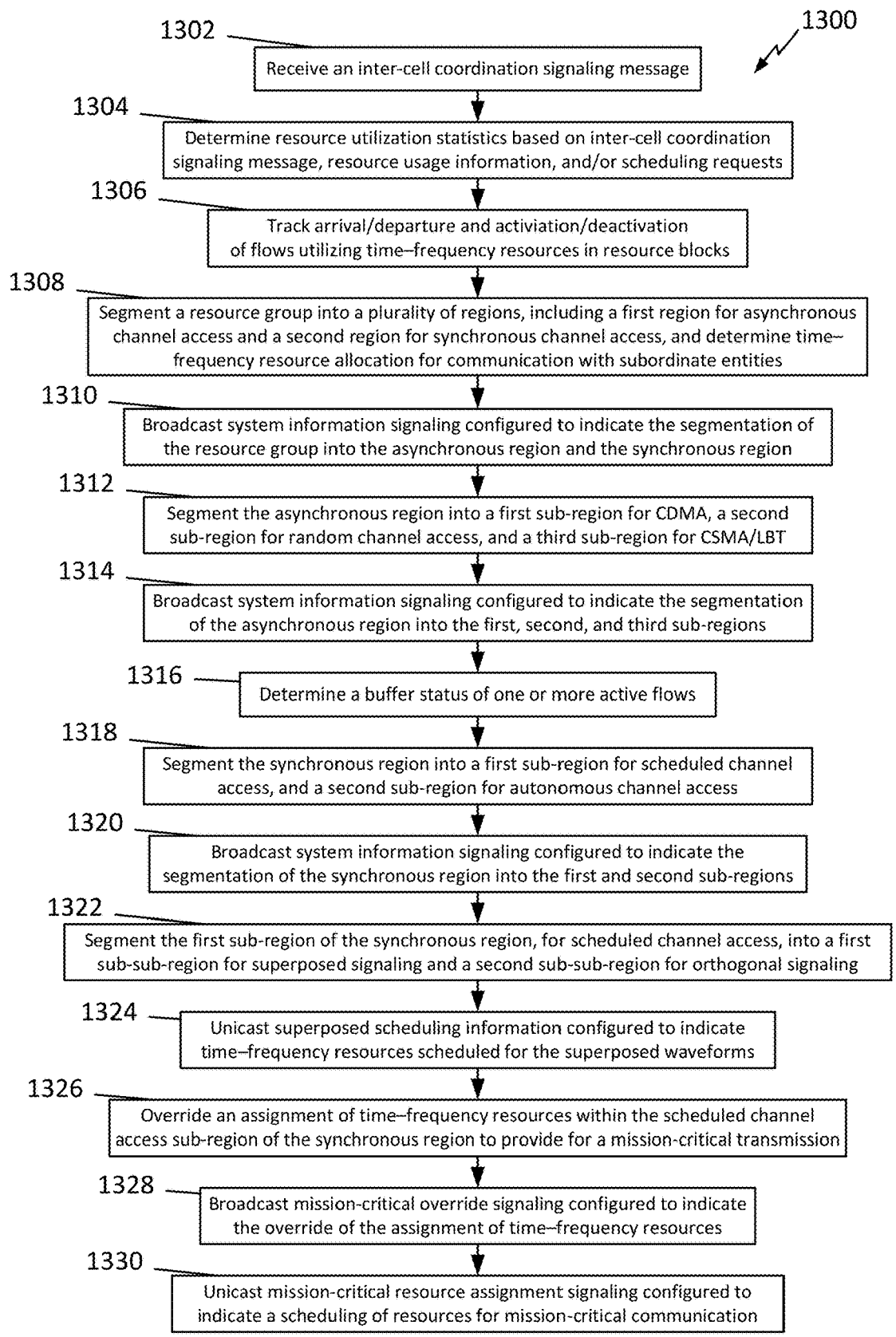
FIG. 13 is a flow chart illustrating an exemplary process of communicating utilizing a unified air interface in accordance with some embodiments.

FIG. 13 is a flow chart illustrating an exemplary process 1300 for wireless communication over an air interface in accordance with various aspects of the present disclosure. In some examples, the process 1300 may be implemented by a scheduling entity, which may be any of the devices or nodes illustrated in FIG. 1. In some examples, the process 1300 may be implemented by a scheduling entity 202, as illustrated in FIGS. 2, 3, and/or 12. In some examples, the process 1300 may be implemented by a processing system 1214 as illustrated in FIG. 12. In other examples, the process 1300 may be implemented by any suitable apparatus or means for carrying out the described functions.

In block 1302, a scheduling entity 202 may receive (e.g., utilizing a transceiver 1210 and/or physical communication entity 306) an inter-cell coordination signaling message. As described above, inter-cell coordination signaling may include a variety of information signaled between cells, and may be useful for determining scheduling and allocation of time-frequency resources in a resource group. At block 1304, the scheduling entity 202 may determine certain resource utilization statistics of the time-frequency resources, based, e.g., on the inter-cell coordination signaling message, resource utilization statistics of different PHY access modes, scheduling requests from subordinate entities, or any other suitable factors or parameters.

At block 1306, the scheduling entity 202 may track certain arrival or departure information, or activation or deactivation of flows for each of the plurality of physical communication entities, utilizing time-frequency resources in resource blocks managed by the scheduling entity 202.

At block 1308, in accordance with the inter-cell coordination signaling, the resource utilization statistics, and/or the information tracked at block 1306, the scheduling entity 202 may segment a resource group into a plurality of regions, including a first region having time-frequency resources for asynchronous channel access, and a second region having time-frequency resources for synchronous channel access. Further, the scheduling entity 202 may determine time-frequency resource allocation within the air interface for communication with one or more subordinate entities, utilizing each of the physical communication entities or transceivers.

At block 1310, the scheduling entity 202 may transmit a signaling message to the one or more subordinate entities to indicate the time-frequency resource allocation within the air interface. Here, the signaling message may be a broadcast message of system information signaling, being broadcasted according to a timing interval corresponding to a plurality of frames.

At block 1312, the scheduling entity 202 may segment the time-frequency resources within the asynchronous region into a plurality of sub-regions, including a first sub-region for a CDMA channel access mode, and a second sub-region for a random access channel access mode. In some examples, the scheduling entity 202 may further segment the asynchronous region into a third sub-region for a CSMA/LBT channel access mode. At block 1314, the scheduling entity 202 may broadcast the system information signaling, being configured to indicate the segmentation of the asynchronous region into the first, second, and third sub-regions. Here, the broadcasts may be according to a timing interval corresponding to a plurality of subframes.

At block 1316, the scheduling entity 202 may determine a buffer status of one or more active flows utilizing the autonomous channel access mode or the scheduled channel access mode. Further, at block 1318, the scheduling entity 202 may segment the time-frequency resources within the synchronous region into a first sub-region for a scheduled channel access mode, and a second sub-region having time-frequency resources for an autonomous channel access mode. At block 1320, the scheduling entity 202 may broadcast system information system information signaling configured to indicate the segmentation of the synchronous region into the first sub-region and the second sub-region. Here, the broadcasts may be made to the one or more subordinate entities according to a timing interval corresponding to a plurality of subframes.

At block 1322, the scheduling entity 202 may further segment the first sub-region of the synchronous region, for scheduled channel access, into a first sub-sub-region for communication utilizing superposed waveforms, and a second sub-sub-region for communication utilizing orthogonal waveforms. At block 1324, the scheduling entity 202 may unicast superposed scheduling information configured to indicate time-frequency resources scheduled for the superposed waveforms, according to a timing interval corresponding to a subframe.

At block 1326, the scheduling entity 202 may further be configured to override an assignment of time-frequency resources within the first sub-region (i.e., the scheduled channel access sub-region) of the synchronous region, to provide for a mission-critical transmission. At block 1328, the scheduling entity 202 may broadcast certain mission-critical override signaling, configured to indicate the override of the assignment of time-frequency resources, to the one or more subordinate entities according to a timing interval corresponding to less than one subframe. At block 1330, the scheduling entity 202 may unicast certain mission-critical resource assignment signaling, configured to indicate a scheduling of resources for the mission-critical communication.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 3, 11, and/or 12 may be configured to perform one or more of the methods, features, or steps described herein and illustrated in FIGS. 4, 5, 6, 7, 8, 9, 10, and/or 13. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

As those skilled in the art will readily appreciate, various aspects described throughout this disclosure may be extended to any suitable telecommunication system or systems, network architectures, and communication standards. By way of example, various aspects may be applied to UMTS systems such as W-CDMA, TD-SCDMA, and TD-CDMA. Various aspects may also be applied to systems employing Long Term Evolution (LTE) (in FDD, TDD, or both modes), LTE-Advanced (LTE-A) (in FDD, TDD, or both modes), LTE-U, CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems, including those described by yet-to-be defined wide area network standards. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects.

For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method, operable at a scheduling entity, for wireless communication over an air interface, the method comprising:
    segmenting a resource group into a plurality of regions, including a first region comprising time-frequency resources for an asynchronous channel access mode and a second region comprising time-frequency resources for a synchronous channel access mode, the resource group comprising a set of time-frequency resources available for wireless communication over the air interface;
    determining a time-frequency resource allocation within the air interface for communication with one or more subordinate entities utilizing each of a plurality of physical communication entities at the scheduling entity; and
    transmitting a signaling message to the one or more subordinate entities, the signaling message configured to indicate the time-frequency resource allocation within the air interface.

2. The method of claim 1, wherein the first region is separated from the second region in frequency.

3. The method of claim 2, wherein the segmenting the resource group further comprises separating the first region from the second region with a guard band between the first region and the second region.

4. The method of claim 1, wherein the transmitting the signaling message comprises broadcasting the signaling message as system information signaling to the one or more subordinate entities according to a timing interval corresponding to a plurality of frames.

5. The method of claim 1, further comprising segmenting the time-frequency resources within the first region into a plurality of sub-regions including a first sub-region comprising time-frequency resources for a code division multiple access (CDMA) channel access mode, and a second sub-region comprising time-frequency resources for a random access channel access mode.

6. The method of claim 5, wherein the segmenting the time-frequency resources into the first region and the second region, and the segmenting the time-frequency resources within the first region into the CDMA channel access mode and the random access channel access mode, comprise segmenting in accordance with information about activation or deactivation of one or more existing flows that utilize time-frequency resources in the resource group, and resource utilization statistics of the regions and sub-regions of the resource group.

7. The method of claim 5, wherein the first sub-region is separated from the second sub-region in frequency.

8. The method of claim 7, wherein the segmenting the time-frequency resources within the second region further comprises separating the first sub-region from the second sub-region with a guard band between the first sub-region and the second sub-region.

9. The method of claim 5, wherein the plurality of sub-regions further includes a third sub-region comprising time-frequency resources for a carrier sense multiple access (CSMA) or listen before talk (LBT) channel access mode.

10. The method of claim 5, wherein the transmitting the signaling message comprises broadcasting system information signaling to the one or more subordinate entities according to a timing interval corresponding to a plurality of subframes.

11. The method of claim 1, further comprising segmenting the time-frequency resources within the second region into a plurality of sub-regions including a first sub-region comprising time-frequency resources for a scheduled channel access mode, and a second sub-region comprising time-frequency resources for an autonomous channel access mode.

12. The method of claim 11, wherein the segmenting the time-frequency resources within the second region into the scheduled channel access mode and the autonomous channel access mode, is in accordance with a buffer status of one or more active flows utilizing the autonomous channel access mode or the scheduled channel access mode.

13. The method of claim 11, wherein the transmitting the signaling message comprises broadcasting system information signaling configured to indicate the segmentation between the first sub-region and the second sub-region to the one or more subordinate entities according to a timing interval corresponding to a plurality of subframes.

14. The method of claim 11, wherein the scheduled channel access mode comprises a first sub-sub-region for communication utilizing superposed waveforms and a second sub-sub-region for communication utilizing orthogonal waveforms.

15. The method of claim 14, wherein the transmitting the signaling message comprises unicasting superposed scheduling information configured to indicate time-frequency resources scheduled for the superposed waveforms, according to a timing interval corresponding to a subframe.

16. The method of claim 11, further comprising overriding an assignment of time-frequency resources within the first sub-region to provide for a mission-critical transmission.

17. The method of claim 16, wherein the transmitting the signaling message comprises broadcasting mission-critical override signaling configured to indicate the override of the assignment of time-frequency resources, to the one or more subordinate entities according to a timing interval corresponding to less than one subframe.

18. The method of claim 17, wherein the transmitting the signaling message further comprises unicasting mission-critical resource assignment signaling configured to indicate a scheduling of resources for mission-critical communication.

19. The method of claim 1, wherein the transmitting the signaling message to the one or more subordinate entities further comprises transmitting the signaling message utilizing a first physical communication entity of the plurality of physical communication entities,
wherein the signaling message comprises scheduling information for scheduling time-frequency resources for utilization by a second physical communication entity of the plurality of physical communication entities.

20. The method of claim 1, wherein the transmitting the signaling message to the one or more subordinate entities further comprises transmitting the signaling message utilizing a first physical communication entity of the plurality of physical communication entities,
wherein the signaling message comprises an acknowledgment and/or negative acknowledgment message corresponding to a transmission received utilizing a second physical communication entity of the plurality of physical communication entities.

21. A non-transitory computer-readable medium storing computer-executable code at a scheduling entity, for wireless communication over an air interface, the computer-executable code comprising:
instructions for causing the scheduling entity to segment a resource group into a plurality of regions, including a first region comprising time-frequency resources for an asynchronous channel access mode and a second region comprising time-frequency resources for a synchronous channel access mode, the resource group comprising a set of time-frequency resources available for wireless communication over the air interface;
instructions for causing the scheduling entity to determine a time-frequency resource allocation within the air interface for communication with one or more subordinate entities utilizing each of a plurality of physical communication entities at the scheduling entity; and
instructions for causing the scheduling entity to transmit a signaling message to the one or more subordinate entities, the signaling message configured to indicate the time-frequency resource allocation within the air interface.

22. The non-transitory computer-readable medium of claim 21, wherein the first region is separated from the second region in frequency.

23. The non-transitory computer-readable medium of claim 22, wherein the instructions for causing the scheduling entity to segment the resource group are further configured to cause the scheduling entity to separate the first region from the second region with a guard band between the first region and the second region.

24. The non-transitory computer-readable medium of claim 21, wherein the instructions for causing the scheduling entity to transmit the signaling message are further configured to cause the scheduling entity to broadcast the signaling message as system information signaling to the one or more subordinate entities according to a timing interval corresponding to a plurality of frames.

25. The non-transitory computer-readable medium of claim 21, further comprising instructions for causing the scheduling entity to segment the time-frequency resources within the first region into a plurality of sub-regions including a first sub-region comprising time-frequency resources for a code division multiple access (CDMA) channel access mode, and a second sub-region comprising time-frequency resources for a random access channel access mode.

26. The non-transitory computer-readable medium of claim 25, wherein the instructions for causing the scheduling entity to segment the time-frequency resources into the first region and the second region, and to segment the time-frequency resources within the first region into the CDMA channel access mode and the random access channel access mode, are configured to segment in accordance with information about activation or deactivation of one or more existing flows that utilize time-frequency resources in the resource group, and resource utilization statistics of the regions and sub-regions of the resource group.

27. The non-transitory computer-readable medium of claim 25, wherein the first sub-region is separated from the second sub-region in frequency.

28. The non-transitory computer-readable medium of claim 27, wherein the instructions for causing the scheduling entity to segment the time-frequency resources within the second region are configured to separate the first sub-region from the second sub-region with a guard band between the first sub-region and the second sub-region.

29. The non-transitory computer-readable medium of claim 25, wherein the plurality of sub-regions further includes a third sub-region comprising time-frequency resources for a carrier sense multiple access (CSMA) or listen before talk (LBT) channel access mode.

30. The non-transitory computer-readable medium of claim 25, wherein the instructions for causing the scheduling entity to transmit the signaling message are configured to cause the scheduling entity to broadcast system information signaling to the one or more subordinate entities according to a timing interval corresponding to a plurality of subframes.

31. The non-transitory computer-readable medium of claim 21, further comprising instructions for causing the scheduling entity to segment the time-frequency resources within the second region into a plurality of sub-regions including a first sub-region comprising time-frequency resources for a scheduled channel access mode, and a second sub-region comprising time-frequency resources for an autonomous channel access mode.

32. The non-transitory computer-readable medium of claim 31, wherein the instructions for causing the scheduling entity to segment the time-frequency resources within the second region into the scheduled channel access mode and the autonomous channel access mode, are configured to segment in accordance with a buffer status of one or more active flows utilizing the autonomous channel access mode or the scheduled channel access mode.

33. The non-transitory computer-readable medium of claim 31, wherein the instructions for causing the scheduling entity to transmit the signaling message are configured to cause the scheduling entity to broadcast system information signaling configured to indicate the segmentation between the first sub-region and the second sub-region to the one or more subordinate entities according to a timing interval corresponding to a plurality of subframes.

34. The non-transitory computer-readable medium of claim 31, wherein the scheduled channel access mode comprises a first sub-sub-region for communication utilizing superposed waveforms and a second sub-sub-region for communication utilizing orthogonal waveforms.

35. The non-transitory computer-readable medium of claim 34, wherein the instructions for causing the scheduling entity to transmit the signaling message are configured to cause the scheduling entity to unicast superposed scheduling information configured to indicate time-frequency resources scheduled for the superposed waveforms, according to a timing interval corresponding to a subframe.

36. The non-transitory computer-readable medium of claim 31, further comprising instructions for causing the scheduling entity to override an assignment of time-frequency resources within the first sub-region to provide for a mission-critical transmission.

37. The non-transitory computer-readable medium of claim 36, wherein the instructions for causing the scheduling entity to transmit the signaling message are configured to cause the scheduling entity to broadcast mission-critical override signaling configured to indicate the override of the assignment of time-frequency resources, to the one or more subordinate entities according to a timing interval corresponding to less than one subframe.

38. The non-transitory computer-readable medium of claim 37, wherein the instructions for causing the scheduling entity to transmit the signaling message are configured to cause the scheduling entity to unicast mission-critical resource assignment signaling configured to indicate a scheduling of resources for mission-critical communication.

39. The non-transitory computer-readable medium of claim 21, wherein the instructions for causing the scheduling entity to transmit the signaling message to the one or more subordinate entities are configured to cause the scheduling entity to transmit the signaling message utilizing a first physical communication entity of the plurality of physical communication entities,
wherein the signaling message comprises scheduling information for scheduling time-frequency resources for utilization by a second physical communication entity of the plurality of physical communication entities.

40. The non-transitory computer-readable medium of claim 21, wherein the instructions for causing the scheduling entity to transmit the signaling message to the one or more subordinate entities are configured to cause the scheduling entity to transmit the signaling message utilizing a first physical communication entity of the plurality of physical communication entities,
wherein the signaling message comprises an acknowledgment and/or negative acknowledgment message corresponding to a transmission received utilizing a second physical communication entity of the plurality of physical communication entities.

41. A scheduling entity configured for wireless communication over an air interface, comprising:
means for segmenting a resource group into a plurality of regions, including a first region comprising time-frequency resources for an asynchronous channel access mode and a second region comprising time-frequency resources for a synchronous channel access mode, the resource group comprising a set of time-frequency resources available for wireless communication over the air interface;
means for determining a time-frequency resource allocation within the air interface for communication with one or more subordinate entities utilizing each of a plurality of physical communication entities at the scheduling entity; and
means for transmitting a signaling message to the one or more subordinate entities, the signaling message configured to indicate the time-frequency resource allocation within the air interface.

42. The scheduling entity of claim 41, wherein the first region is separated from the second region in frequency.

43. The scheduling entity of claim 42, wherein the means for segmenting the resource group are configured for separating the first region from the second region with a guard band between the first region and the second region.

44. The scheduling entity of claim 41, wherein the means for transmitting the signaling message are configured for broadcasting the signaling message as system information signaling to the one or more subordinate entities according to a timing interval corresponding to a plurality of frames.

45. The scheduling entity of claim 41, further comprising means for segmenting the time-frequency resources within the first region into a plurality of sub-regions including a first sub-region comprising time-frequency resources for a code division multiple access (CDMA) channel access mode, and a second sub-region comprising time-frequency resources for a random access channel access mode.

46. The scheduling entity of claim 45, wherein the means for segmenting the time-frequency resources into the first region and the second region, and the means for segmenting the time-frequency resources within the first region into the CDMA channel access mode and the random access channel access mode, are configured for segmenting in accordance with information about activation or deactivation of one or more existing flows that utilize time-frequency resources in the resource group, and resource utilization statistics of the regions and sub-regions of the resource group.

47. The scheduling entity of claim 45, wherein the first sub-region is separated from the second sub-region in frequency.

48. The scheduling entity of claim 47, wherein the means for segmenting the time-frequency resources within the second region are configured for separating the first sub-region from the second sub-region with a guard band between the first sub-region and the second sub-region.

49. The scheduling entity of claim 45, wherein the plurality of sub-regions further includes a third sub-region comprising time-frequency resources for a carrier sense multiple access (CSMA) or listen before talk (LBT) channel access mode.

50. The scheduling entity of claim 45, wherein the means for transmitting the signaling message are configured for broadcasting system information signaling to the one or more subordinate entities according to a timing interval corresponding to a plurality of subframes.

51. The scheduling entity of claim 41, further comprising means for segmenting the time-frequency resources within the second region into a plurality of sub-regions including a first sub-region comprising time-frequency resources for a scheduled channel access mode, and a second sub-region comprising time-frequency resources for an autonomous channel access mode.

52. The scheduling entity of claim 51, wherein the means for segmenting the time-frequency resources within the second region into the scheduled channel access mode and the autonomous channel access mode, are configured for segmenting in accordance with a buffer status of one or more active flows utilizing the autonomous channel access mode or the scheduled channel access mode.

53. The scheduling entity of claim 51, wherein the means for transmitting the signaling message are configured for broadcasting system information signaling configured to indicate the segmentation between the first sub-region and the second sub-region to the one or more subordinate entities according to a timing interval corresponding to a plurality of subframes.

54. The scheduling entity of claim 51, wherein the scheduled channel access mode comprises a first sub-sub-region for communication utilizing superposed waveforms and a second sub-sub-region for communication utilizing orthogonal waveforms.

55. The scheduling entity of claim 54, wherein the means for transmitting the signaling message are configured for unicasting superposed scheduling information configured to indicate time-frequency resources scheduled for the superposed waveforms, according to a timing interval corresponding to a subframe.

56. The scheduling entity of claim 51, further comprising means for overriding an assignment of time-frequency resources within the first sub-region to provide for a mission-critical transmission.

57. The scheduling entity of claim 56, wherein the means for transmitting the signaling message are configured for broadcasting mission-critical override signaling configured to indicate the override of the assignment of time-frequency resources, to the one or more subordinate entities according to a timing interval corresponding to less than one subframe.

58. The scheduling entity of claim 57, wherein the means for transmitting the signaling message are configured for unicasting mission-critical resource assignment signaling configured to indicate a scheduling of resources for mission-critical communication.

59. The scheduling entity of claim 41, wherein the means for transmitting the signaling message to the one or more subordinate entities are configured for transmitting the signaling message utilizing a first physical communication entity of the plurality of physical communication entities,
  wherein the signaling message comprises scheduling information for scheduling time-frequency resources for utilization by a second physical communication entity of the plurality of physical communication entities.

60. The scheduling entity of claim 41, wherein the means for transmitting the signaling message to the one or more subordinate entities are configured for transmitting the signaling message utilizing a first physical communication entity of the plurality of physical communication entities,
  wherein the signaling message comprises an acknowledgment and/or negative acknowledgment message corresponding to a transmission received utilizing a second physical communication entity of the plurality of physical communication entities.

\* \* \* \* \*